(12) United States Patent
Raj

(10) Patent No.: US 10,654,756 B1
(45) Date of Patent: *May 19, 2020

(54) FORMULATIONS FOR ENGINEERED CERAMIC MATRIX COMPOSITES FOR HIGH TEMPERATURE APPLICATIONS

(71) Applicant: United States of Americas as represented by the Administrator of NASA, Washington, DC (US)

(72) Inventor: Sai V. Raj, Strongsville, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/875,283

(22) Filed: Jan. 19, 2018

Related U.S. Application Data

(63) Continuation-in-part of application No. 15/411,375, filed on Jan. 20, 2017, now Pat. No. 10,590,044.
(Continued)

(51) Int. Cl.
| | |
|---|---|
| C04B 41/52 | (2006.01) |
| C04B 35/80 | (2006.01) |
| C04B 35/626 | (2006.01) |
| C04B 35/657 | (2006.01) |
| C04B 41/00 | (2006.01) |

(Continued)

(52) U.S. Cl.
CPC ........ *C04B 35/806* (2013.01); *C04B 35/6261* (2013.01); *C04B 35/6264* (2013.01); *C04B 35/657* (2013.01); *C04B 41/009* (2013.01); *C04B 41/5064* (2013.01); *C04B 41/87* (2013.01); *C04B 2235/3826* (2013.01); *C04B 2235/3873* (2013.01); *C04B 2235/3891* (2013.01); *C04B 2235/5244* (2013.01);
(Continued)

(58) Field of Classification Search
CPC ... C04B 41/52; C04B 41/009; C04B 41/4515; C04B 41/4523; C04B 41/5071; C04B 41/85; C04B 35/565; C04B 2235/3826; C04B 2235/3891; C04B 2235/616
See application file for complete search history.

(56) References Cited

U.S. PATENT DOCUMENTS

| | | | |
|---|---|---|---|
| 3,718,441 | A | 2/1973 | Landingham |
| 4,240,835 | A | 12/1980 | Laskow et al. |

(Continued)

FOREIGN PATENT DOCUMENTS

| | | |
|---|---|---|
| EP | 0946460 B1 | 6/1999 |
| EP | 1059274 A1 | 12/2000 |

(Continued)

OTHER PUBLICATIONS

Raj,Sai V., Thermal expansion behavior of hot-pressed engineered matrices, Ceramics International, Feb. 1, 2016, pp. 2557-2569, vol. 42, Issue 2, Elsevier US.
(Continued)

*Primary Examiner* — Alexander M Weddle
(74) *Attorney, Agent, or Firm* — Robert H. Earp, III

(57) ABSTRACT

An engineered ceramic matrix is provided to blunt and self-heal matrix cracks to reduce oxygen ingress into a fiber reinforced composite.

8 Claims, 27 Drawing Sheets

Related U.S. Application Data which is a continuation-in-part of application No. 13/905,333, filed on May 30, 2013, now abandoned.

(60) Provisional application No. 62/449,344, filed on Jan. 23, 2017, provisional application No. 62/281,927, filed on Jan. 22, 2016, provisional application No. 61/654,311, filed on Jun. 1, 2012.

(51) Int. Cl.
*C04B 41/50* (2006.01)
*C04B 41/87* (2006.01)

(52) U.S. Cl.
CPC .. *C04B 2235/606* (2013.01); *C04B 2235/616* (2013.01); *C04B 2235/728* (2013.01)

(56) References Cited

U.S. PATENT DOCUMENTS

| | | | |
|---|---|---|---|
| 4,889,686 A | | 12/1989 | Singh et al. |
| 5,030,597 A | * | 7/1991 | Ogata ............... C04B 35/5611 501/102 |
| 5,069,841 A | | 12/1991 | Petrovic et al. |
| 5,292,692 A | | 3/1994 | Maloney et al. |
| 5,294,489 A | | 3/1994 | Luthra et al. |
| 5,330,590 A | | 7/1994 | Raj |
| 5,330,854 A | | 7/1994 | Singh |
| 5,376,427 A | | 12/1994 | Singh |
| 5,429,997 A | | 7/1995 | Hebsur |
| 5,510,303 A | | 4/1996 | Kameda et al. |
| 5,643,514 A | | 7/1997 | Chwastiak |
| 5,900,277 A | | 5/1999 | Fox et al. |
| 5,962,103 A | | 10/1999 | Luthra et al. |
| 5,990,025 A | | 11/1999 | Suyama et al. |
| 6,024,898 A | | 2/2000 | Steibel et al. |
| 6,288,000 B1 | | 9/2001 | Hebsur |
| 7,258,530 B2 | | 8/2007 | Morrison et al. |
| 8,043,720 B2 | | 10/2011 | Corman et al. |
| 2006/0169404 A1 | | 8/2006 | Thebault et al. |
| 2009/0264273 A1 | | 10/2009 | Riedell et al. |
| 2010/0009143 A1 | | 1/2010 | Pailler et al. |
| 2011/0236695 A1 | | 9/2011 | Schmidt |
| 2011/0256411 A1 | | 10/2011 | Courcot et al. |
| 2011/0268577 A1 | | 11/2011 | Bouillon et al. |
| 2012/0076927 A1 | | 3/2012 | Bhatt et al. |
| 2015/0246851 A1 | * | 9/2015 | Miranzo ............... B82Y 30/00 252/504 |
| 2016/0040299 A1 | | 2/2016 | Allemand et al. |

FOREIGN PATENT DOCUMENTS

| | | |
|---|---|---|
| WO | WO 2010072978 A1 | 7/2010 |
| WO | WO 2014135700 A1 | 9/2014 |
| WO | WO 2010063946 A1 | 6/2019 |

OTHER PUBLICATIONS

"Slurry Characteristics", accessed on Jun. 18, 2019. (Year: 2019).

Hebsur, Mohan G., Development and Characterization, Materials Science and Engineering, (1999), pp. 24-37, vol. A261.

Quemard, Self-healing mechanisms of a SiC fiber reinforced multi-layered ceramic matrix composite in hight pressure steam environments, Journal of the European Ceramic Society, (2007), pp. 2085-2094, vol. 27.

Naslain, Boron-bearing species in ceramic matrix composites for long-term aerospace applications, Journal of Solid State Chemistry, Elsevier, (2004), pp. 449-456, vol. 177, USA.

Emiliani, Characterization and oxidation resistance of hot-pressed chromium diboride, Material Science and Engineering, (1993), pp. 111-124, vol. A172, USA.

Nakao, Effect of SiC Nano sizing on self-crack-healing during service, Proceedings of the First International Conference on Self Healing Materials, Apr. 2007, Noordwijk aan Zee, The Netherlands.

Jung, Self-Healing of Heavily Machined Cracks in Si3N4/SiC and Resultant High-Temperature Fatigue Strength, Proceedings of the First International Conferende on Self Healing Materials, Apr. 2007, Noordwijk aan Zee, The Netherlands.

Zuo, Oxidation behavior of tow-dimensional C/SiC modified with self-healing Si—B—C coating in static air, Corrosion Science, Elvsevier, (2012), pp. 87-93, vol. 65.

Yin, Microstructure and oxidation resistance of carbon/silicon carbide composites infiltrated with chromium silicide, Materials Science and Engineering, Elsevier, (2000), pp. 89-94, vol. A290.

Luthra, Melt Infiltrated (MI) SiC/SiC composited for Gas Turbines Applications, (2003), USA.

Dicarlo, Fabrication Routes for Continuous Fiber-Reinforced Ceramic Composites (CFCC), NASA/TM, (1998), USA.

Petrovic, J. J., & Honnell, R. E. MoSi2 particle reinforced-Sic and Si3N4 matrix composites. Journal of Materials Science Letters, 9( 9), pp. 1083-1084. doi: 10.1007/bf00727883 (Year: 1990).

Daintith, J. Dictionary of Science, Intermetallic Compound, p. 426. Families of intermetallic structure types: A selection, Pergamon Materials Series, Pergamon, 2008, vol. 13, pp. 617-750, ISSN 14 70-1804, ISBN 9780080440996, http ://dx.doi.org/1 0.1 016/S 14 70/1804(08)80009-0.

Johnson, S, Recent Development in Ultra High Temperature Ceramics at NASA Ames, AIAA, 2009 Paper No. 2009-7219.

Chawla, Ceremic Reinforements, Ceramic Matrix Composites, Second Edition, pp. 47-105 (2003).

Dictionary.com, "blunt", http://dictionary.reference.com/browse/blunt?s=t, accessed Sep. 14, 2015.

Feng, T., The oxidation behavior and mechanical properties of MoSi2—CrSi2—SiC—Si coated carbon/carbon composites in high-temperature oxidizing atmosphere, Corrosion Science 53, Aug. 22, 2011, 4102-4108.

* cited by examiner $(\Delta L/L_0)_{EM} = V_{silicide}(\Delta L/L_0)_{silicide} + V_{SiC}(\Delta L/L_0)_{SiC} + V_{Si3N4}(\Delta L/L_0)_{Si3N4}$

1800

FORMULATIONS FOR ENGINEERED CERAMIC MATRIX COMPOSITES FOR HIGH TEMPERATURE APPLICATIONS

CROSS REFERENCE TO RELATED APPLICATIONS

This application claims the benefit of U.S. Provisional Application Ser. No. 62/449,344, filed on Jan. 23, 2017, and is a continuation-in-part application of U.S. patent application Ser. No. 15/411,375, filed on Jan. 20, 2017, which claims the benefit of U.S. Provisional Application Ser. No. 62/281,927, filed on Jan. 22, 2016, and is a continuation-in-part application of U.S. patent application Ser. No. 13/905,333 filed on May 30, 2013, which claims the benefit of U.S. Provisional Patent Application Ser. No. 62/269,187 filed Dec. 18, 2015. The subject matter of this earlier-filed application is hereby incorporated by reference in its entirety.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD

The present invention relates to matrix formulations for engineered ceramic matrix composites (E-CMCs) for high temperature applications.

BACKGROUND

Ceramic matrix composites (CMCs) are being developed for applications up to 1755 K (2700 F). With traditional CMC's, the silicon carbide (SiC) fiber tows in preforms are coated with a boron nitride (BN) coating overlaid with a SiC layer deposited by chemical vapor infiltration (CVI) traditionally termed as "CVI SiC" in the literature. In preforms with CVI SiC partially filling the space (termed as "partial CVI SiC") between neighboring 0° and 90° BN-coated SiC tows, the remaining space in traditional CMCs used in 1623 K (2462 F) applications is filled by a "filler matrix" consisting of either Silicon (Si), SiC, or both, using a Si melt infiltration (MI) process, CVI, slurry infiltration, polymer impregnation and pyrolysis (PIP) and/or both.

Ceramic matrix composites containing free Si within the CVI SiC and in the filler matrices cannot be used at temperatures above 1623 K (2462 F) due to poor creep properties. Alternatively, the void space between the fiber tows can be filled solely with SiC either by CVI (termed as "full CVI SiC"), which results in good creep properties but with poor crack resistance capabilities or in combination with PIP, slurry infiltration and MI.

Therefore, if a crack propagates either from the protective environmental barrier coating (EBC), the bond coat or internally from a fiber tow, the crack is likely to propagate rapidly through the brittle SiC filler matrix in the CMC leading to considerable matrix damage and corresponding overloading of the fibers and a reduction in composite life. Furthermore, when these cracks are connected to the external surface, oxygen ingress into the interior of the CMC is likely to result in the oxidation of the BN coatings, resulting in a decrease in the CMC life.

Accordingly, it would be beneficial to improve the durability of the matrix and eliminate free Si to allow the SiC/SiC CMCs to be used at temperatures up to 1755 K (2700 F).

SUMMARY

Certain embodiments of the present invention may provide solutions to the problems and needs in the art that have not yet been fully identified, appreciated, or solved by current SiC-based engineered ceramic matrices. For example, some embodiments generally pertain to a CMC matrix that eliminates the presence of free Si to inhibit crack propagation and to self-heal cracks, preventing oxygen ingress from the surface and protecting the BN coatings on the SiC fibers.

In an embodiment, a process for fabricating engineered ceramic matrix composites (E-CMCs) for high temperature applications may include combining and attrition milling a mixture of silicon carbide (SiC), silicon nitride, CrMoSi, CrMoSiGe, CrMoSiY, and/or $CrSi_2$, CrSi, or $Cr_5Si_3$, and one or more self-healing additives. The process also includes wet attrition milling the mixture using ethanol and silicon carbide grinding media, grinding the mixture into particles and homogenously mixing the mixture of the silicon carbide, the silicon nitride, silicide powders, and the one or more self-healing additives. The process further includes slurry preparing the engineered CMC prior to infiltration of the SiC/SIC preform, and infiltrating the slurry SiC/SiC preform with the engineered CMC slurry either under gravity, vacuum, or high pressure to allow particulates to spread uniformly within cavities of the SiC/SiC preform. The process also includes melt infiltrating the SiC/SiC preform with $CrSi_2$, CrSi, $Cr_5Si_3$, or any combination thereof to fill in the voids left behind after the slurry infiltration.

In another embodiment, an apparatus includes an engineered ceramic matrix composite (E-CMC) configured to eliminate presence of free silicon (Si) to inhibit crack propagation and to self-heal cracks, preventing oxygen ingress from a surface and protecting boron nitride (BN) coating.

In yet another embodiment, an engineered ceramic matrix (ECM) includes crack blunting particles configured to increase fracture toughness of the ECM by blunting a crack tip and slowing or stopping growth of the crack within the matrix. The crack blunting particles comprises $CrSi_2$, CrMoSi, or both for crack blunting.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
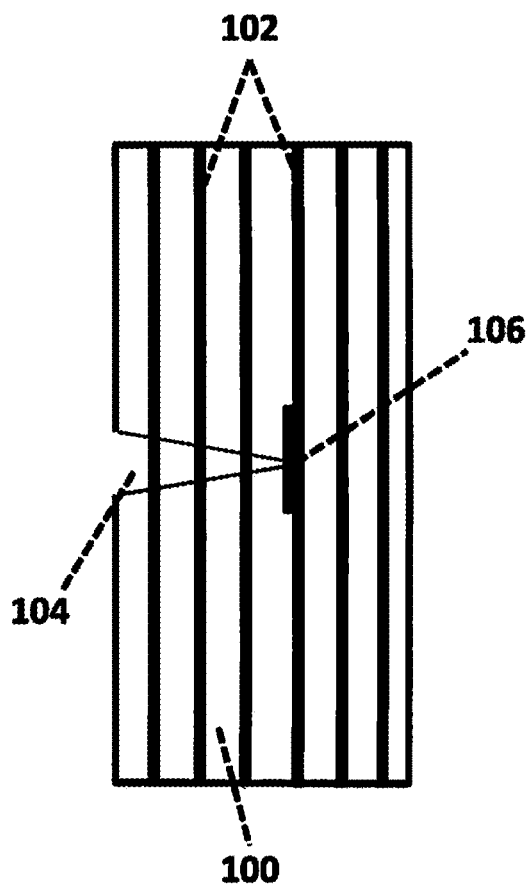
FIG. 1 illustrates a schematic of a crack in a SiC filler matrix in a conventional SiC/SiC CMC.

FIG. 1 illustrates a conventional SiC/SiC CMC matrix 100 having a plurality of SiC fibers 102 and a crack 104. These SiC fibers are coated with a layer of boron nitride to improve the room temperature fracture toughness of the composite. However, it should be noted that SiC filler matrix 100 is brittle at all temperatures and has limited plasticity at high temperature, leading to fast crack propagation in matrix 100. Thus, matrix 100 cannot bear an applied stress higher than the matrix cracking stress. Interface debonding (106) leads to dissipation of the crack tip energy, which improves the crack resistance properties of the CMC. Crack 104 allows oxygen to react with the CVI SiC, the BN interface coating and the SiC fibers 102. When oxygen interacts with the boron nitride coating and SiC fibers 102, the durability and strength of the SiC fibers 102 is greatly reduced. Also, matrix 100 of FIG. 1 does not have a self-healing component, and does not have a crack tip blunting ability due to the absence of well dispersed ductile particles.

Also, because matrix 100 may be infiltrated with silicon, the presence of free silicon can be detrimental to the mechanical properties of the composite. In particular, the life of the composite is limited to applications below a certain temperature (generally less than 1623 K) due to the silicon reacting with the boron nitride coating of SiC fibers 102.

Embodiments of the present invention pertain to an engineered ceramic matrix (ECM) (sometimes referred to engineered matrix (EM) in this document) that can lead to improved fracture toughness due to crack blunting, as well as crack self-healing, i.e., fill up the crack with low viscosity oxides to reduce oxygen ingress to the fibers in a fiber reinforced composite. Additionally, the presence of Cr in the engineered ceramic matrices containing Cr—Si alloys (e.g. CrMoSi, $CrSi_2$, CrSi, $Cr_3Si$, $Cr_5Si_3$, $(Cr,Mo)_3Si$, $(Cr,Mo)_5Si_3$ etc. including containing Ge as a solid solution in the alloys, such as CrMoSiGe) can getter any oxygen entering the filler matrix, and thereby protect the SiC fiber, BN coating and CVI SiC from oxidation. As a result, the high temperature strength of the composite should increase since the ECM design would allow it to carry the applied load for a longer duration before shedding it on the fibers.

Figure 2:
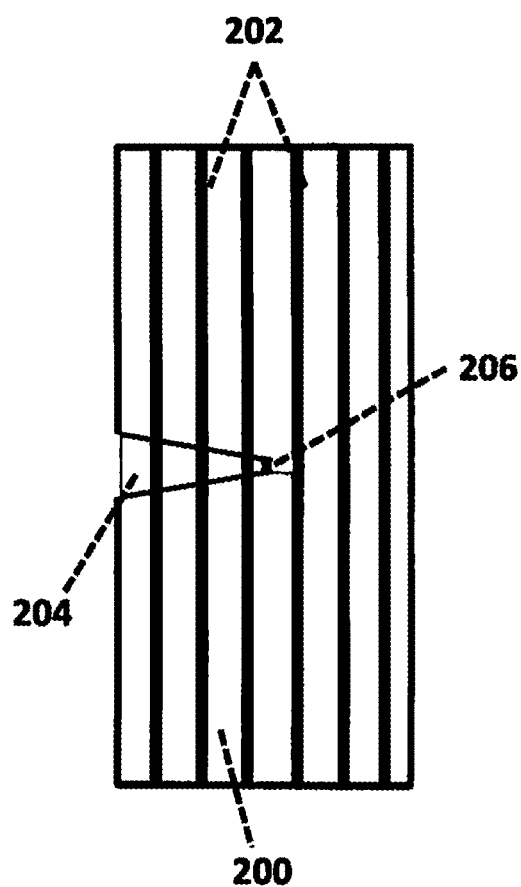
FIG. 2 illustrates a schematic of an engineered ceramic matrix (ECM) with crack blunting ability, according to an embodiment of the present invention.

FIG. 2 illustrates an ECM 200 with a crack blunting particle 206, according to an embodiment of the present invention. In this embodiment, the crack blunting particle 206 increases the fracture toughness of the ECM 200 by blunting the crack tip and slowing or stopping the growth of a crack 204 within the matrix 200. Essentially, due to the presence of the crack blunting particle 206, the growth of crack 204 is reduced or stopped. This minimizes the chances of overloading and subsequent failure of the SiC fibers 202 and prevents the premature failure of the composite.

It should also be appreciated that in certain embodiments, the ECM 200 may be plastically compliant at high temperatures to blunt cracks in the SiC fibers, as shown in FIG. 2. To make the ECM 200 plastically compliant, additives may be applied. For example, CrMoSi may be used to ensure that ECM 200 is plastically compliant. In some embodiments, chromium disilicide ($CrSi_2$) may be used to ensure that ECM 200 is plastically ductile to blunt the cracks. Alternatively, a combination of a CrMoSi alloy and $CrSi_2$ may be used for crack blunting.

Figure 3:
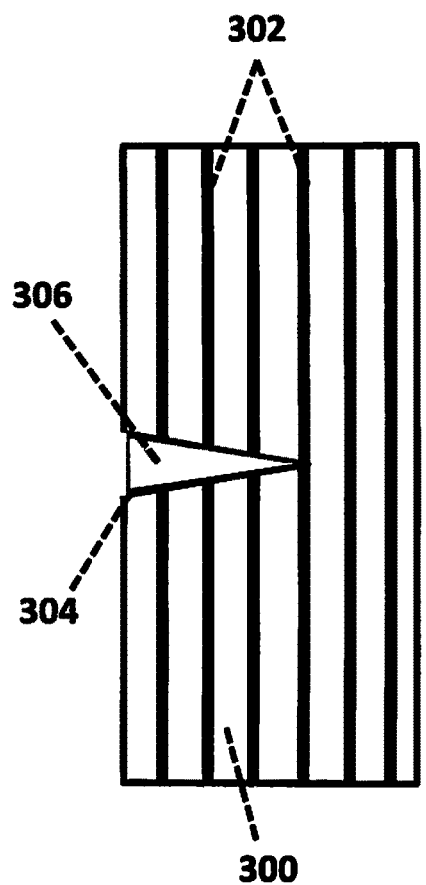
FIG. 3 illustrates a schematic of an ECM with a self-healing additive, according to an embodiment of the present invention.

FIG. 3 illustrates an ECM 300 with a self-healing constituent in the matrix, according to an embodiment of the present invention. With a self-healing component, crack 304 can be healed with low viscosity oxides 306, thereby preventing oxygen from reacting with the coatings on the SiC fibers. As a result, the durability of the engineered ceramics matrix 300 is improved. It should be appreciated that ECM 300 may have a thermal strain that is compatible with SiC fibers 302.

TABLE 1

Major and Minor Matrix Embodiments

Major suicide additives and alternative embodiments

Cr—Mo—Si alloys with Mo between 0 to 60 weight (wt.) percent and Si between 10 and 55 weight percent.
$HfSi_2$, $MoSi_2$, $NbSi_2$, $TaSi_2$, $TiSi_2$, $ReSi_2$, $WSi_2$ with alloy additions of aluminum (Al), chromium (Cr), hafnium (Hf), molybdenum (Mo), niobium
(Nb), rhenium (Re), tantalum (Ta), titanium (Ti), and tungsten (W) between 0 and 75 weight percent.

Minor Additives

Boron Carbide ($B_4C$): 0-10 weight percent;
Chromium boride ($CrB_2$): 0-10 weight percent;
Germanium (Ge): 0-5 weight percent;
Yttrium (Y): 0-5 weight percent;
Zirconium diboride ($ZrB_2$): 0-10 weight percent.
Zirconium silicate ($ZrSiO_4$): 0-5 weight percent.

As shown in Table 1 above, a range of compositions for CrMoSi alloys is provided, as well as self-healing additives used singly or in combination in the ECMs. Other embodiments involving other silicides used singly or in combination with suitable alloying elements are included in Table 1.

TABLE 2

ECM Design Concepts

| Concept | $V_{silicide}$ (%) | $V_{SiC}$ (%) | $V_{Si3N4}$ (%) |
|---|---|---|---|
| Traditional | 0 | 100 | 0 |
| Present Embodiments | x | (100-x-y) | y |

$(\Delta L/L0)Ecm = Vsilicide(\Delta L/L0)silicide + VSiC(\Delta L/L0)SiC + VSi3N4$ Table 2 shows the differences in the matrix design concepts between the traditional and the present embodiments designed to match the thermal strains developed in the fibers and the matrix during thermal cycling. The use of silicides is an illustration of some of the embodiments described herein.

Figure 4:
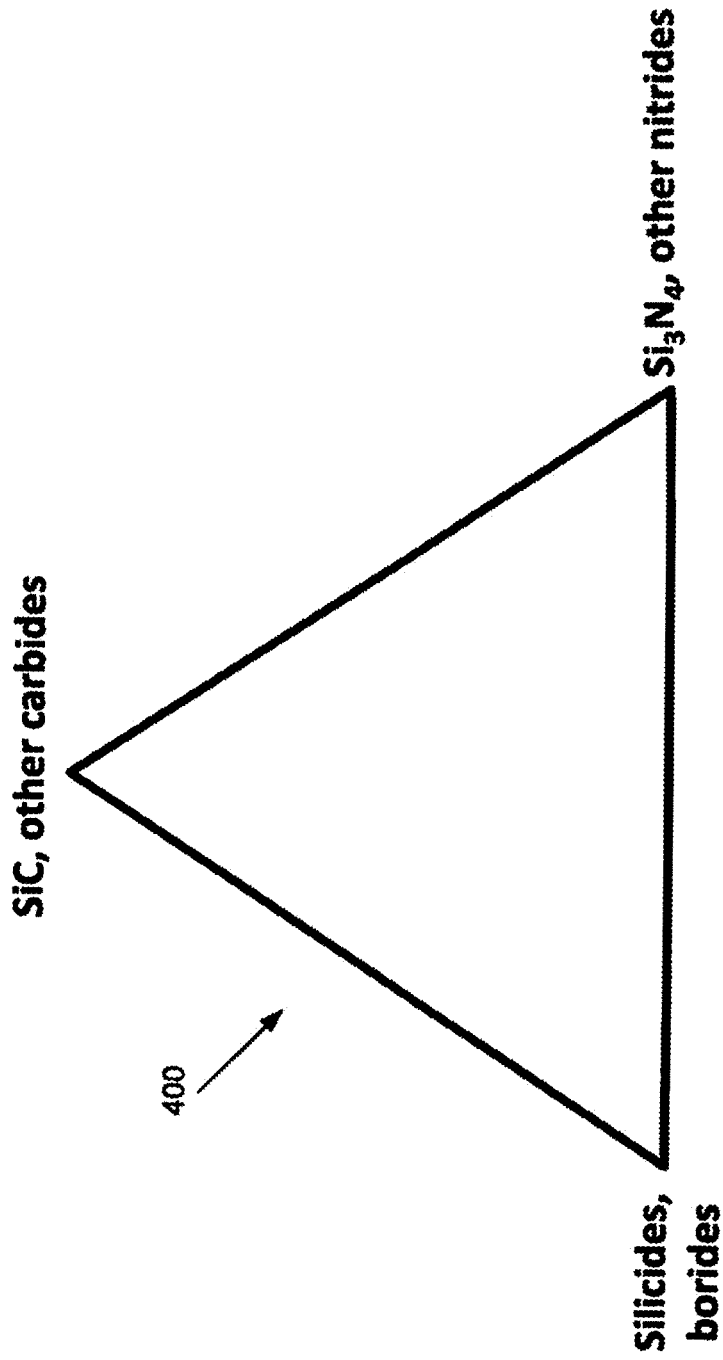
FIG. 4 is a schematic illustration of a generalized ECM design concept shown in Table 2, according to an embodiment of the present invention.

FIG. 4 is a schematic 400 illustrating a matrix design concept of Table 2, according to an embodiment of the present invention. In this embodiment, FIG. 4 shows a concept that can be used for borides, carbides, nitrides and silicides of aluminum (Al), chromium (Cr), hafnium (Hf), molybdenum (Mo), niobium (Nb), rhenium (Re), tantalum (Ta), titanium (Ti), and zirconium (Zr), either alone or in combination, to match the thermal strains developed in the fibers and the matrix during thermal cycling.

Figure 5:
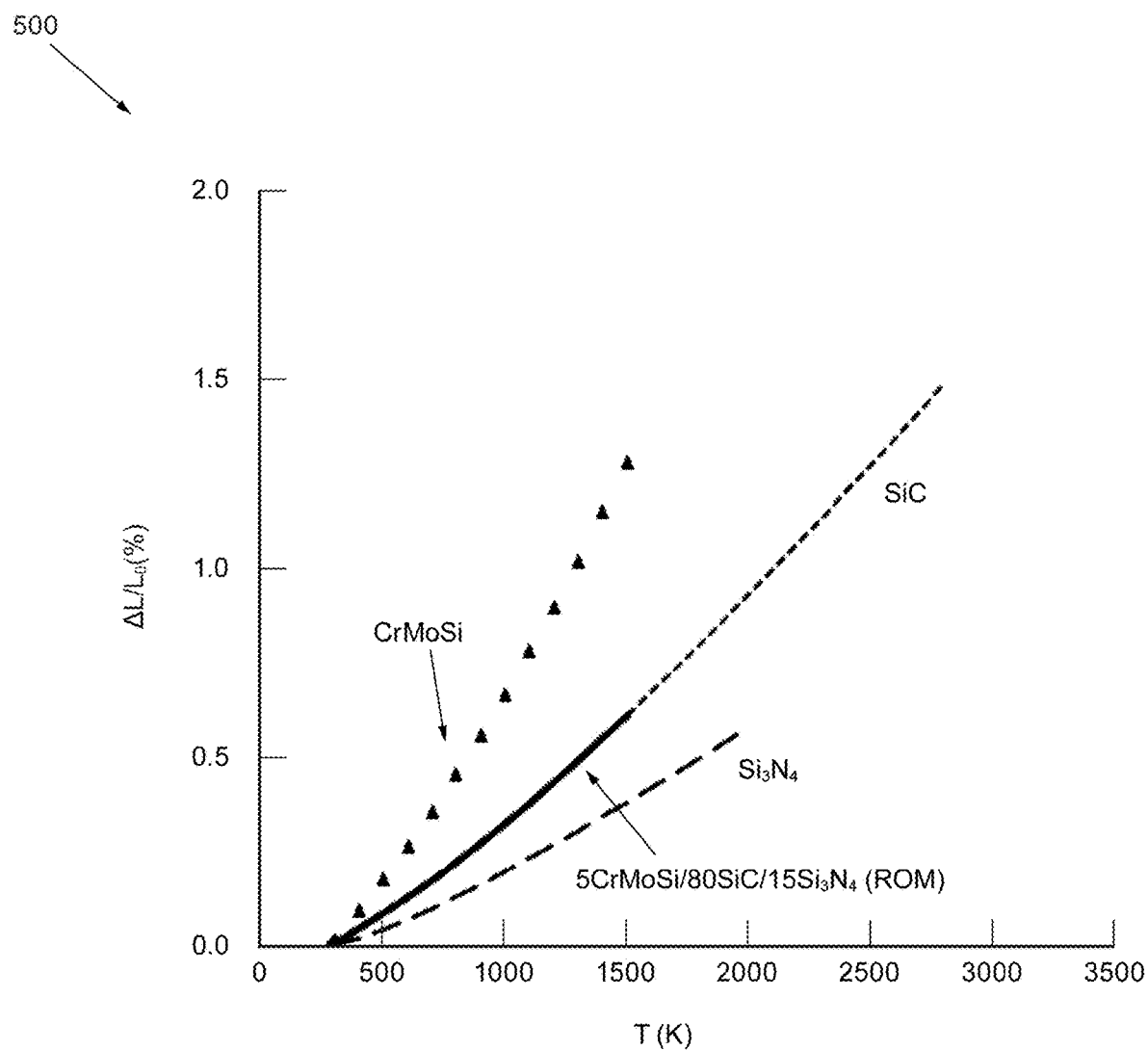
FIG. 5 is a graph illustrating a theoretical prediction based on a mixture of CrMoSi alloy and/or other compatible silicides with silicon nitride and silicon carbide, according to an embodiment of the present invention.

FIG. 5 is a graph 500 illustrating a theoretical prediction based on a mixture of CrMoSi and other compatible silicides with silicon nitride and silicon carbide, according to an embodiment of the present invention. In particular, FIG. 5 shows a graph 500 illustrating a theoretical prediction of the thermal strain with increasing absolute temperature based on a mixture of 5 volume percent CrMoSi, 80 volume percent SiC, and 15 volume percent $Si_3N_4$. Similar embodiments involving borides, carbides and nitrides are possible as demonstrated in FIG. 4.

Figure 6:
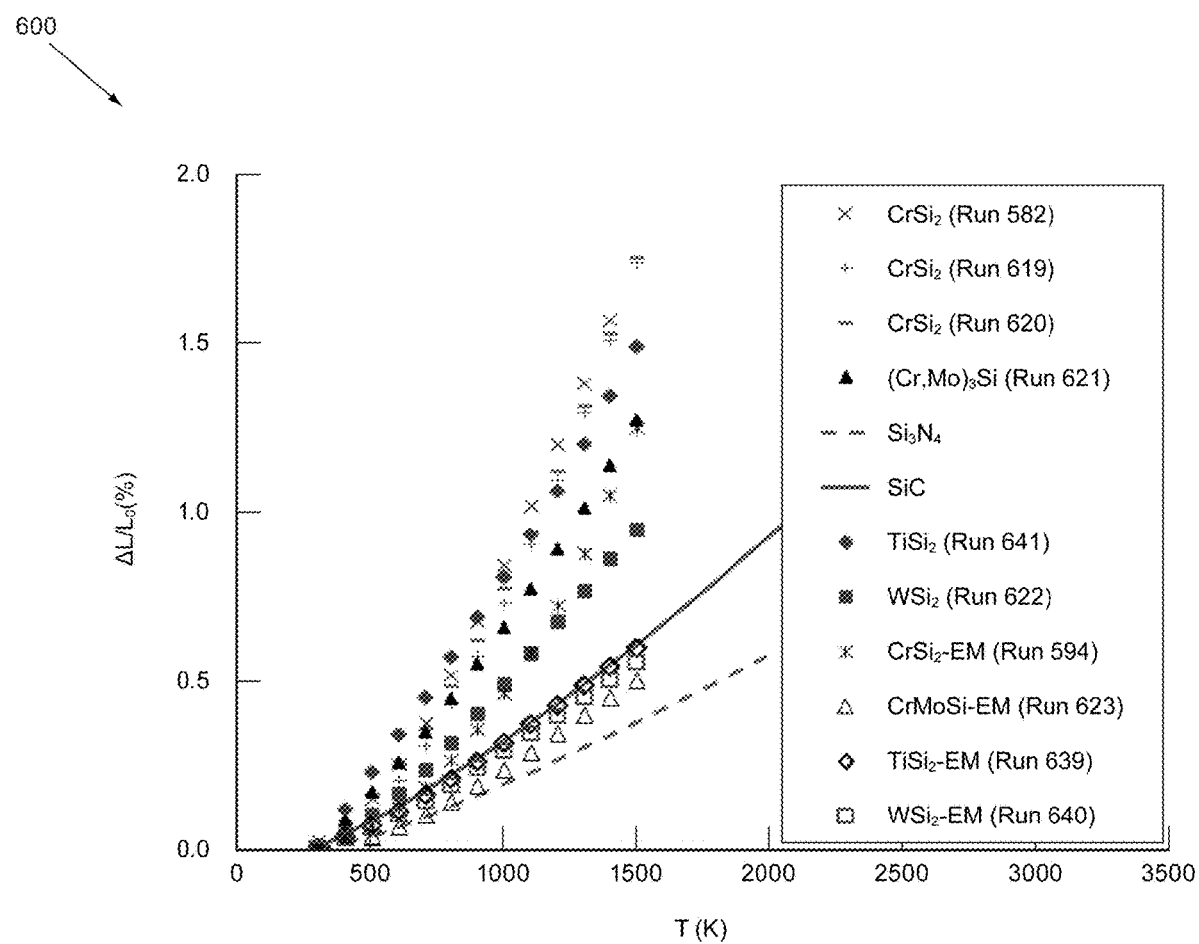
FIG. 6 is a graph illustrating proofs of concepts of several ECM specimens, according to an embodiment of the present invention.

FIG. 6 is a graph 600 illustrating proofs of concepts of several mixtures, according to an embodiment of the present invention. In particular, FIG. 6 shows a graph 600 illustrating a proof of concept of the mixture shown in FIG. 5. For instance, graph 600 shows that the mixture in FIG. 5 allows the ECM to have a thermal strain that is compatible with a thermal strain of the silicon carbide fibers.

Figure 7:
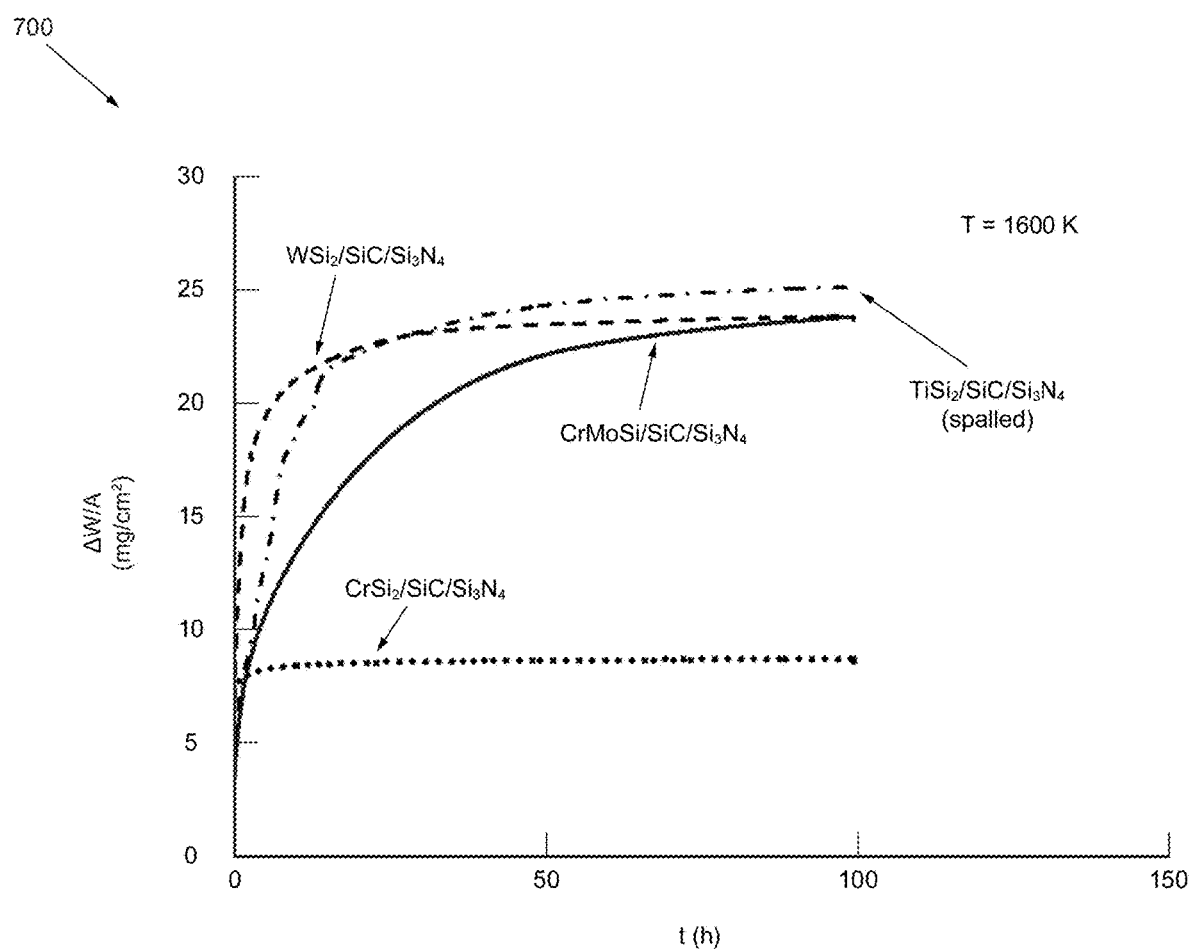
FIG. 7 is a graph illustrating the isothermal oxidation behavior of engineered silicide matrices, according to an embodiment of the present invention.

FIG. 7 is a graph 700 illustrating the isothermal oxidation behavior of the engineered silicide matrices, according to an embodiment of the present invention. In particular, FIG. 7 shows the isothermal oxidation behavior of several silicide/$SiC$/$Si_3N_4$ engineered ceramic matrices. In this embodiment, the metallic element in the engineered ceramic matrices oxidizes faster than Si as indicated in FIG. 7 by the initial increase in the weight change data. Thus, engineered ceramic filler matrices have the potential to getter oxygen before it reaches the BN coating on the SiC fibers as compared to a traditional SiC filler matrix.

Figure 8:
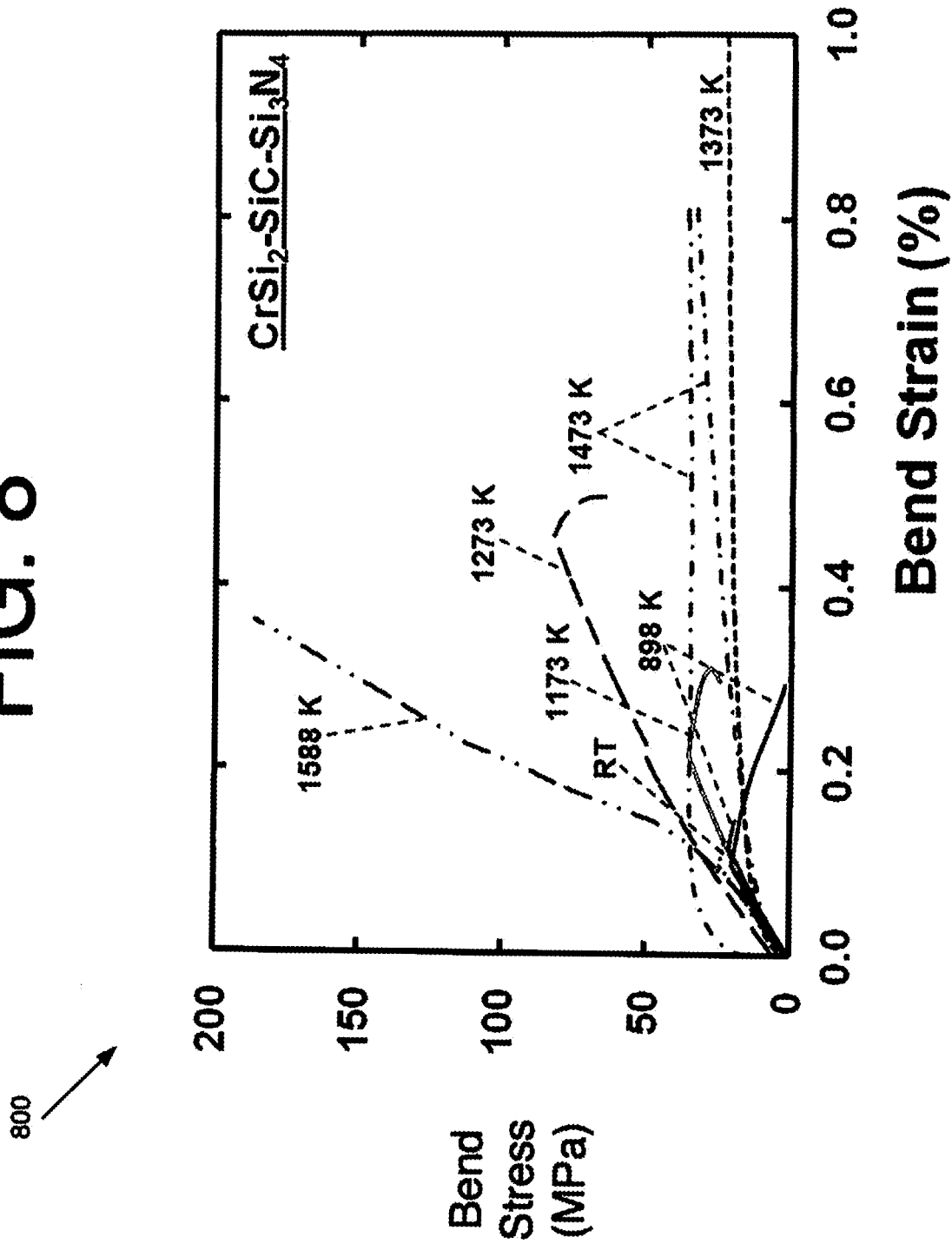
FIG. 8 is a graph illustrating that the plasticity of a $CrSi_2$—SiC—$Si_3N_4$ ECM at high temperatures increases its bend stress and bend strain compared to the room temperature values, according to an embodiment of the present invention.

FIG. 8 is a graph 800 illustrating the plasticity of an ECM at high temperatures, according to an embodiment of the present invention. In this embodiment, graph 800 shows the plasticity of an engineered $CrSi_2$/SiC/$Si_3N_4$ ceramic matrix at high temperatures similar to those in an aircraft engine. It should be appreciated that the concept of plastic blunting discussed with respect to FIG. 2 is evident with the increase in the bend strength at 1588 K, where the plasticity of matrix has effectively blunted the crack tip and decreased crack propagation.

Figure 9:
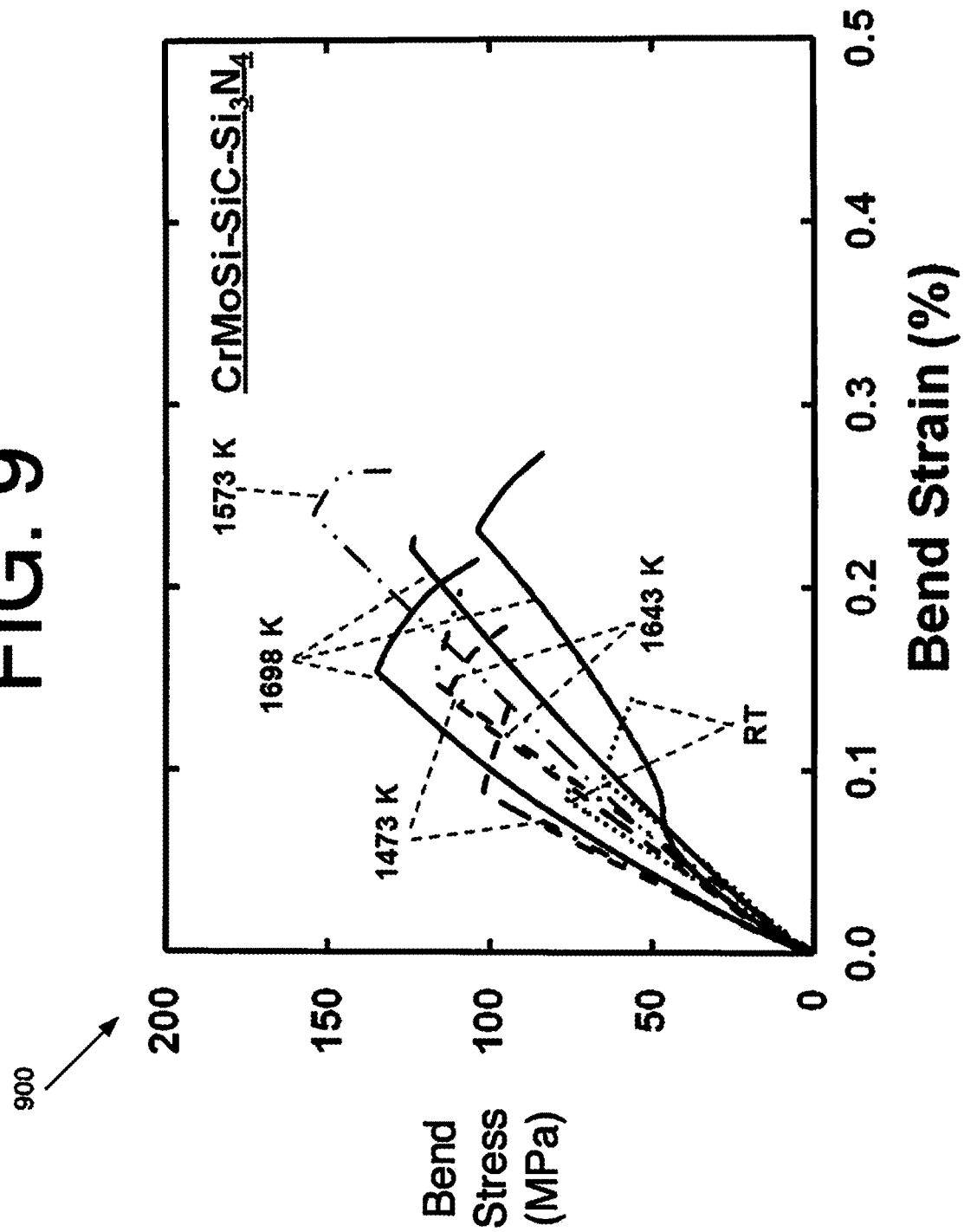
FIG. 9 is a graph illustrating that the bend stresses and bend strains for CrMoSi—SiC—$Si_3N_4$ ECMs are larger at high temperatures than at room temperature due to crack blunting brought about increased plasticity of the matrix, according to an embodiment of the present invention.

FIG. 9 is a graph 900 illustrating bend stress-strain curves for engineered ceramic matrices at different temperatures, according to an embodiment of the present invention. In this embodiment, graph 900 shows that the plasticity of an engineered CrMoSi/SiC/$Si_3N_4$ ceramic matrix at high temperatures blunts the cracks, resulting in an increase the high temperature bend strength. The ECM in this embodiment may use 10 (vol. %)CrMoSi/60 (vol. %)SiC/30 (vol. %)$Si_3N_4$. Further, the ECM can withstand temperatures as high as 1873 K much above conventional silicon-based CMCs.

Figure 10:
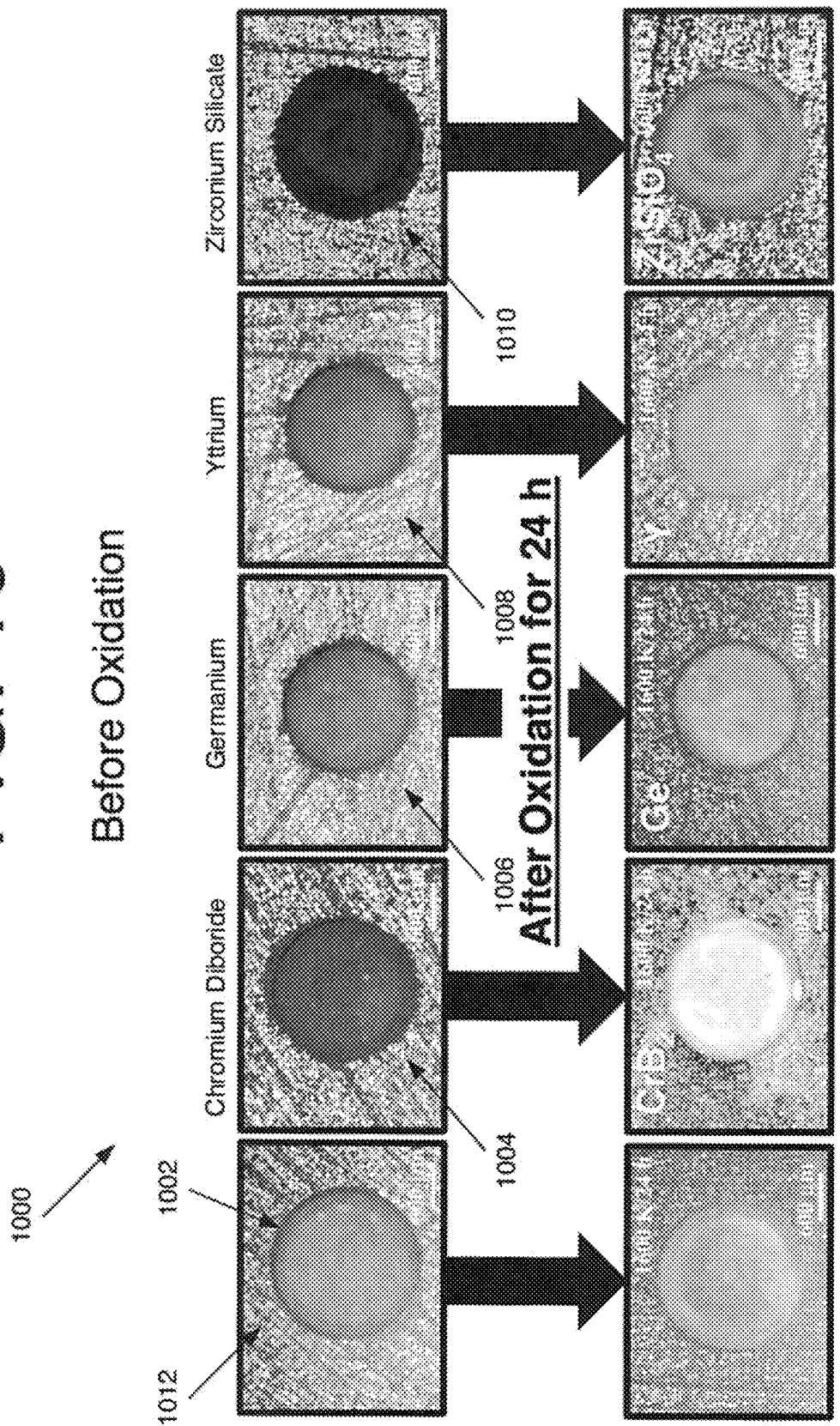
FIG. 10 are images showing comparisons of self-healing characteristics of an ECM containing different self healing constituents, according to an embodiment of the present invention.

Returning to FIG. 3, ECM 300 has the capability to self-heal 306 a crack 304 to reduce ingress of oxygen. For example, in some embodiments, minor additives may be used either singly or in combination for the ECM 300 to have self-healing capabilities. FIG. 10 illustrates self-healing characteristics of an ECM 1000, according to an embodiment of the present invention. ECM may include CrMoSi, SiC and/or $Si_3N_4$ with different additives. See Table 1 for a list of the minor additives. It is noted that some additives, such as $CrB_2$, $ZrSiO_4$, and/or $B_4C$, may be present as particles while others such as Ge, Y may be present as a solid solution such as CrMoSiGe, CrMoSiY, etc.

In this embodiment, ECM 1000 may be composed of CrMoSi/SiC, CrMoSi/SiC/$Si_3N_4$, CrMoSi/SiC/$Si_3N_4$/$CrSi_2$, or CrMoSi/SiC/$Si_3N_4$/$CrSi_2$/$Cr_5Si_3$ with different combinations of the self-healing additives shown in Table 1. Before oxidation, ECM 1000 includes scratches 1012 with a pre-drilled hole 1002. Pre-drilled hole 1002 in this embodiment has a diameter of approximately 1 mm.

Pre-drilled hole 1002 may be filled with low viscosity oxides due to minor additives such as boron carbide, chromium diboride 1004, germanium 1006, yttrium 1008, zirconium diboride and/or zirconium silicate 1010. Each of these additives may be oxidized for a predefined period of time. For example, FIG. 10 shows specimens with scratches which have self-healed after oxidation at 1600 K for 24 h.

Figure 11:
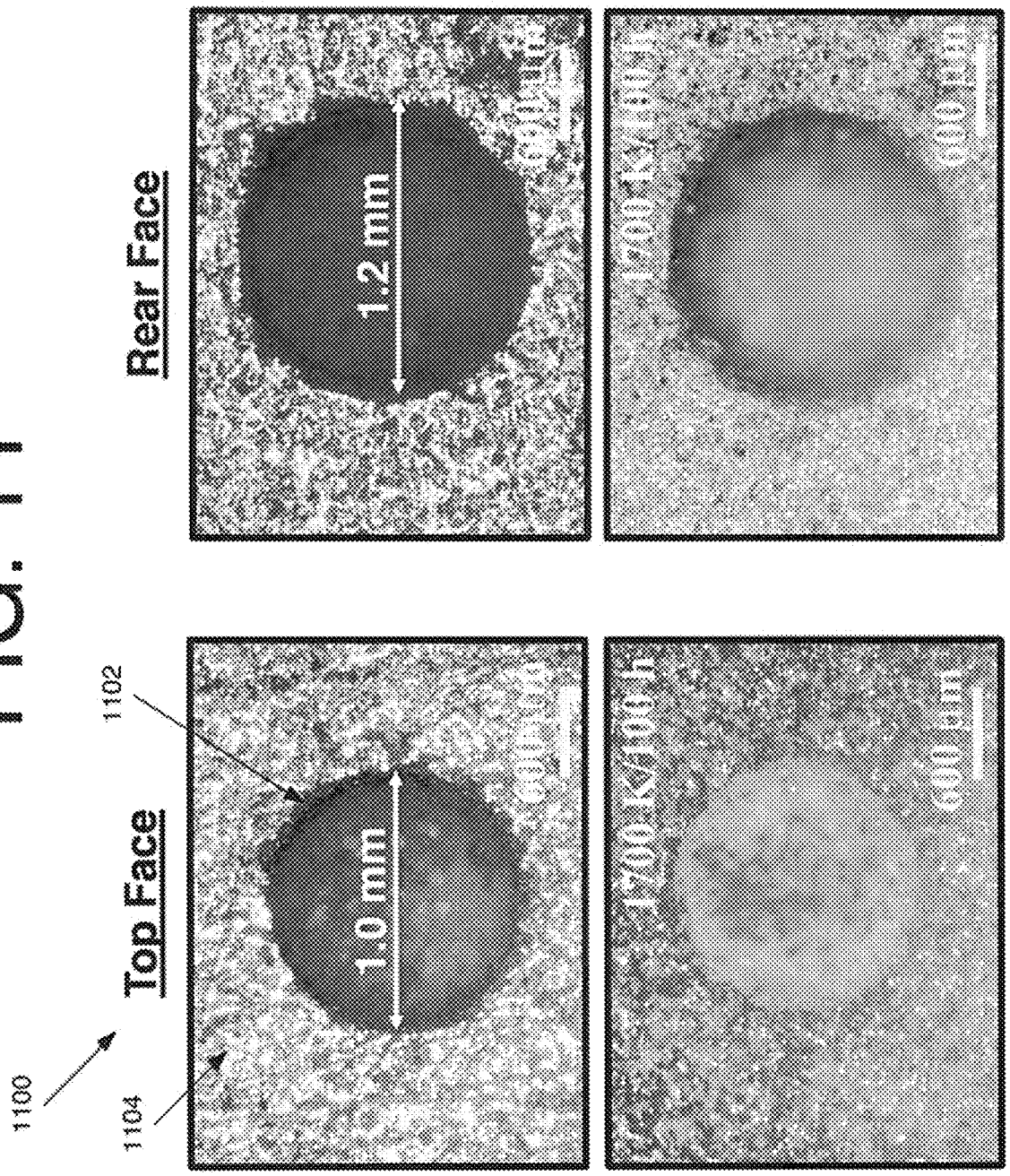
FIG. 11 shows the top and rear faces of a monolithic ECM specimen, according to an embodiment of the present invention.

FIG. 11 shows the top and rear faces of an ECM 1100, according to an embodiment of the present invention. In particular, FIG. 11 shows in this embodiment a top face and a rear face of a CrMoSi/SiC ECM with a minor additive ($CrB_2$) after oxidation at 1700 K for 100 hour. In this example, matrix 1100 includes scratches 1104 and a hole 1102. The diameter of hole 1102 with respect to the top face and rear face may vary in size. In this embodiment, hole 1102 contains the low viscosity oxide due to the oxidation of the self-healing additive $CrB_2$ present in the CrMoSi/SiC ECM. After 100 hours of oxidation at 1700 K, the hole 1102 appears to be healing compared to the hole on the rear face.

Figure 12:
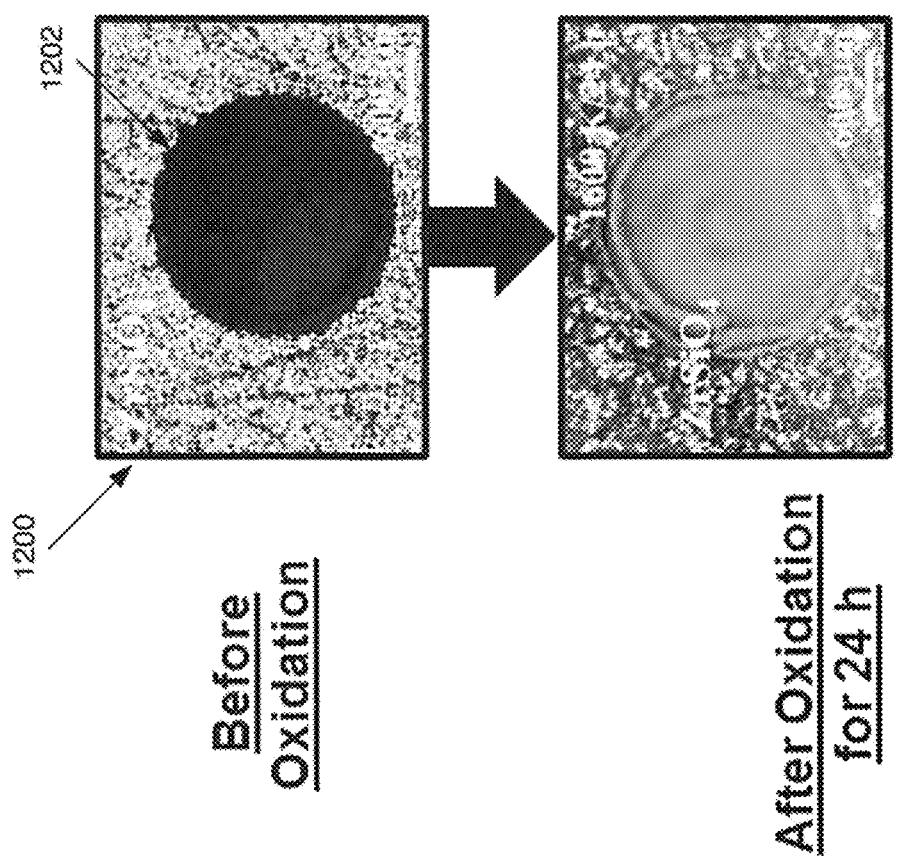
FIG. 12 shows the self-healing behavior of a $CrSi_2$/SiC ECM specimen containing $ZrSiO_4$ after oxidation at 1600 K for 24 h, according to an embodiment of the present invention.

FIG. 12 illustrates self-healing of an ECM 1200 using different additives, according to an embodiment of the present invention. In particular, FIG. 12 shows self-healing of a $CrSi_2$/SiC ECM 1200 using a different minor additive (zirconium silicate) after oxidation at 1600 K for 24 h. For example, in this embodiment, additives, such as zirconium silicate, added to the matrix self-heals hole 1202 in the ECM 1200. It should be appreciated that in other embodiments a combination of boron carbide, chromium diboride, germanium, yttrium, zirconium diboride and zirconium silicate may be used for the ECM to have the self-healing capabilities.

It should be noted that the self-healing ECM may also be dense to increase the thermal conductivity of the fiber reinforced composite. The infiltration of the preform has two components—slurry infiltration and melt infiltration. The filling of voids inside the preform with slurry and melt infiltration increases the thermal conductivity of the composite over that of the preform.

Figure 13:
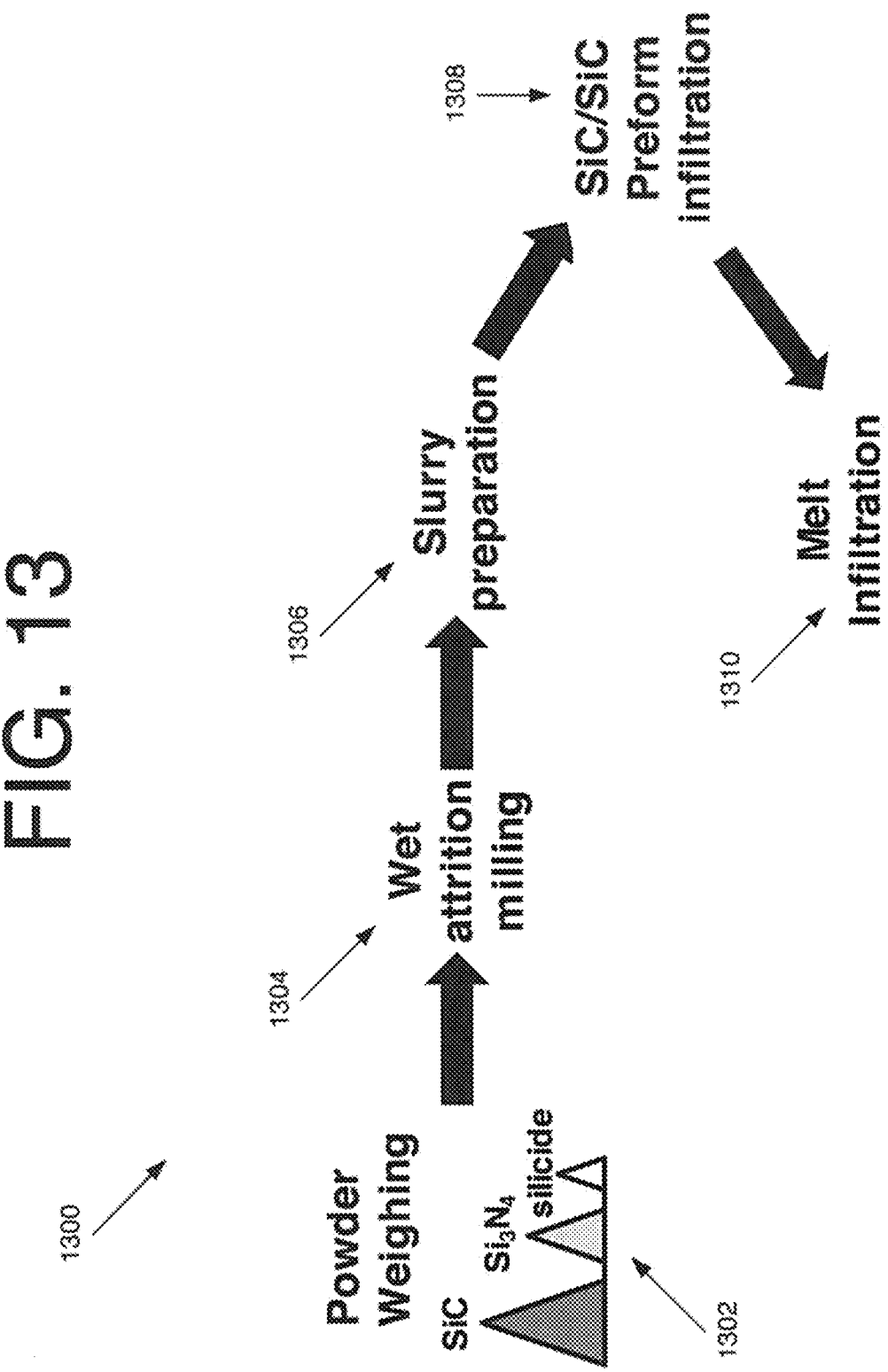
FIG. 13 shows the flow diagram illustrating a typical fabrication process for an E-CMC, according to an embodiment of the present invention.

FIG. 13 is a flow diagram 1300 illustrating the different steps for fabricating an E-CMC, according to an embodiment of the present invention. The process begins at 1302 by combining and attrition milling a mixture of silicon carbide, silicon nitride, silicide powders and one or more self-healing additives. It should be appreciated that other compounds may be combined to form the ECM, as would be understood by a person of ordinary skill in the art. At 1304, the powder mixture is wet attrition milled using ethanol and SiC grinding media to grind it into fine submicron particles and to homogeneously mix the combination of silicon carbide, silicon nitride, silicide powders and the one or more self-healing additives. Depending on the embodiment, the attrition milling time varies between 48 and 64 hours. After attrition milling, the ethanol is decanted and the powder mixture is first air dried and then oven dried to a dry cake, which is then ground to fine powder using a mortar and pestle.

At 1306, ECM slurry is prepared prior to the infiltration of the SiC/SiC preform by mixing the powders in an aqueous alkaline ammonium hydroxide solution containing a dispersant, such as Triton X-100. At 1308, the SiC/SiC preform is infiltrated with the ECM slurry either under gravity, vacuum and/or high pressure depending on the slurry composition, viscosity and pH to allow the particulates to be spread uniformly within the cavities of the preform.

It should be appreciated that other fabrication processes may be used, such as slurry coating the BN and CVI SiC-coated fiber tows to make tapes and stacking up the tapes in a 0° and 90° configuration, and hot pressing and/or hot isostatic pressing (HIP) the stacks to densify the composite. Another process would involve infiltrating 2-D fabric with the matrix slurry, cutting the slurry-infiltrated fabric and laying the fabric in a 0° and 90° configuration, hot pressing and/or HIPing the laid up stack to densify the composite.

At 1310, melt infiltration is performed by infiltrating molten $CrSi_2$, CrSi, $Cr_5Si_3$, $Cr_3Si$ and/or CrMoSi with Mo between 0 to 60 wt. percent and Si between 10 and 55 wt. percent (see Table 1) into the slurry-infiltrated SiC/SiC preform to fill in the voids left behind after the slurry infiltration process 1308. However, depending on the embodiment, the range may change.

Figure 14:
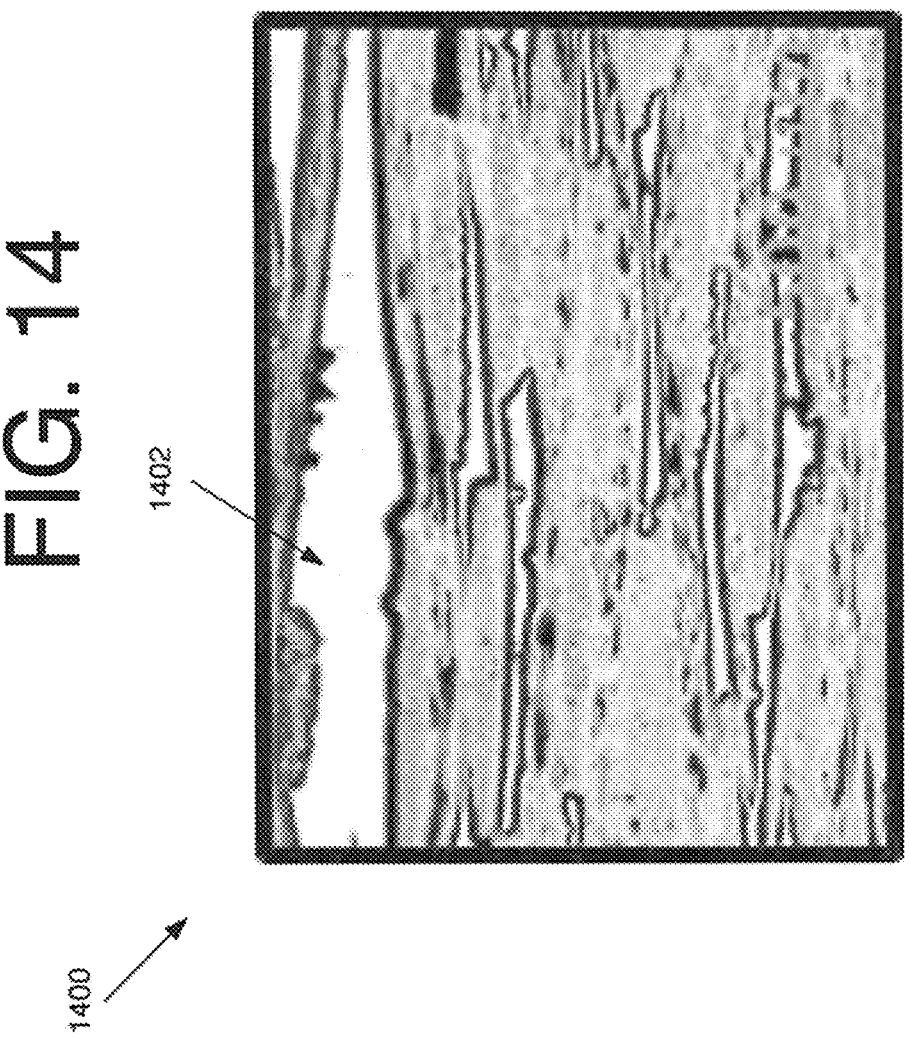
FIG. 14 illustrates the melt infiltration of $CrSi_2$ into BN/SiC coated SiC/SiC preform, according to an embodiment of the present invention.

FIG. 14 shows the microstructure after melt infiltrating $CrSi_2$ into BN and CVI SiC-coated SiC/SiC preform 1400, according to an embodiment of the present invention. In particular, the melt infiltrated SiC/SiC preform may include voids between the fibers that are filled by molten $CrSi_2$ 1402. Other embodiments may include molten CrSi, $Cr_5Si_3$, $Cr_3Si$ and/or CrMoSi with Mo between 0 to 4.0 atomic percent and Si between 23 and 67 atomic percent Si.

Figure 15:
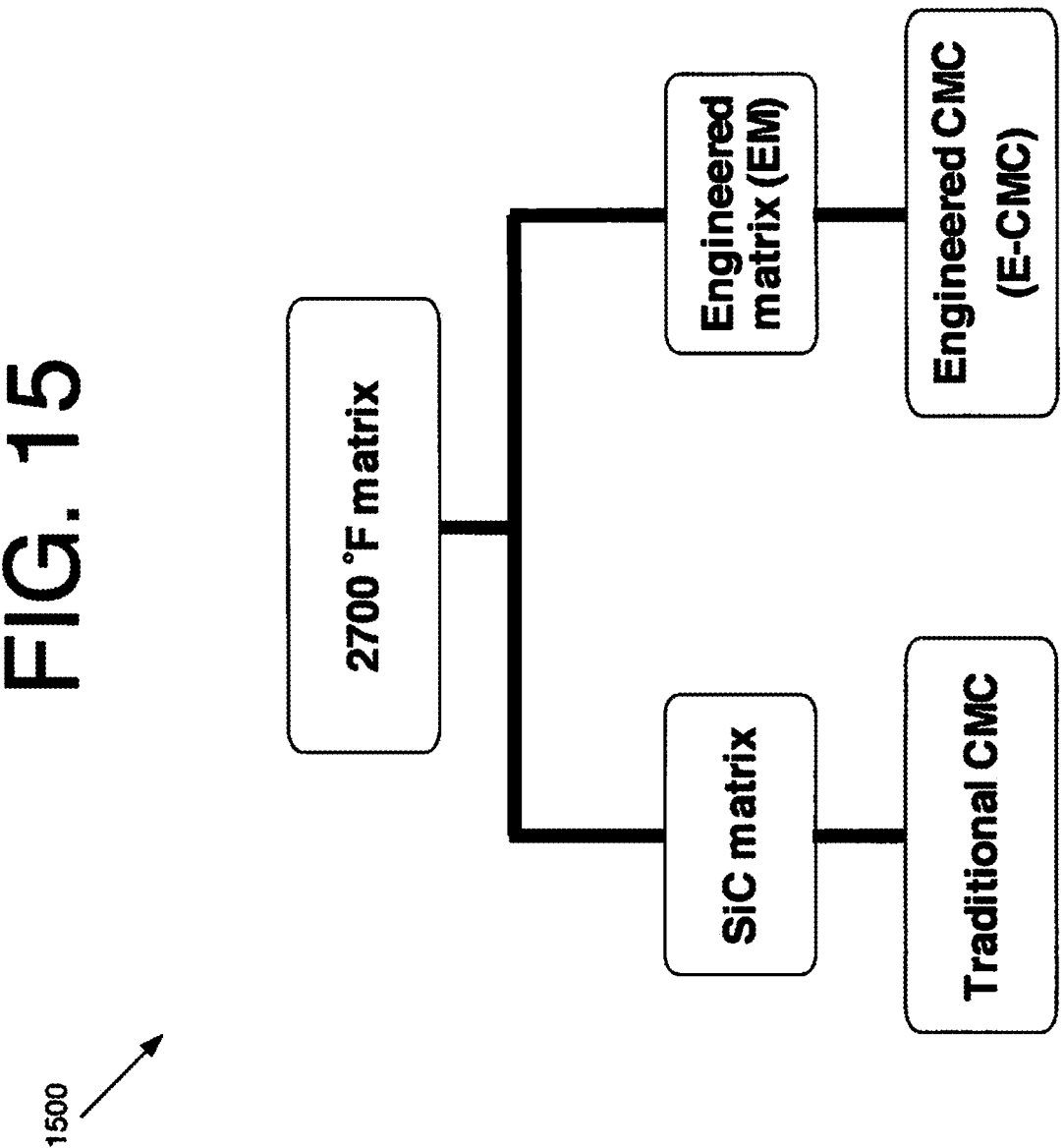
FIG. 15 is a schematic diagram illustrating an engineered SiC matrix as an alternative concept to the traditional SiC CMC matrix for 1755 K (2700 F) applications, according to an embodiment of the present invention.

FIG. 15 is a diagram illustrating an engineered SiC matrix 1500, according to an embodiment of the present invention. In this embodiment, engineered SiC matrix 1500 may serve as an alternative concept to the traditional SiC matrix for CMCs.

Figure 16:
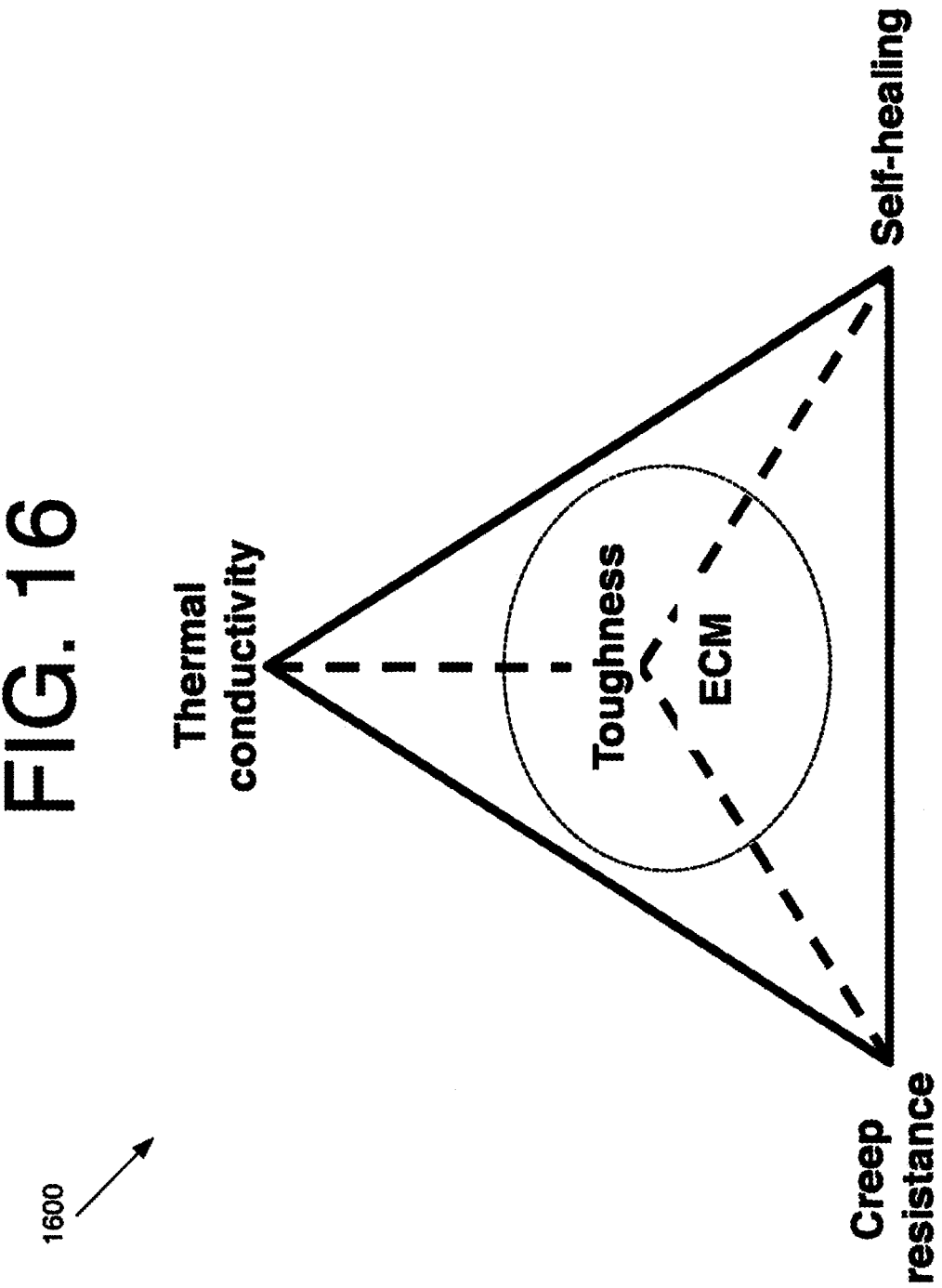
FIG. 16 is a schematic diagram illustrating that the optimized critical matrix properties for the ECM lies within the tetrahedral, according to an embodiment of the present invention.

FIG. 16 is a diagram illustrating a tetrahedral 1600 showing optimization of critical matrix properties for the ECM, according to an embodiment of the present invention. In this diagram, the critical properties of the traditional SiC lies on the edge of tetrahedral 1600. For example, the traditional SiC CMCs have optimized thermal conductivity and creep resistance properties, which is why the traditional SiC is between thermal conductivity and creep resistance in tetrahedral 1900. Thus, this matrix concept is limited in the design space.

In some embodiments, the ECM may have additional properties, such as fracture toughness and self-healing, which the traditional SiC matrix without self-healing additives does not have. The ECM may give more flexibility in designing the matrix towards the properties desired for a particular component. This flexibility cannot be obtained in the traditional matrix.

With the ECM in mind, when looking at FIGS. 2 and 3, crack tip blunting and self-healing may be shown. It should be appreciated that silicide particles at low temperature are generally brittle. At high temperatures above the ductile-to-brittle transition temperature (DBTT), the silicide particles become ductile, so that when a crack tip meets one of these particles, it will blunt and stop propagating. This is shown in FIG. 2, i.e., crack blunting 206 due to improved matrix fracture toughness stops the growth of crack 204. In FIG. 3, self-healing component 306 of fine cracks 304 minimizes oxygen ingress to the coated fibers 302.

Because the SiC fibers are coated with boron nitride, the coatings may become oxidized if there is oxygen ingress through surface-connected cracks. The cracks may be stopped by blunting the cracks in some embodiments. Further, the self-healing compounds in the matrix may heal the cracks by filling up the crack with low viscosity material. Moreover, the ECM may increase reliability and load carrying capacity.

Figure 17:
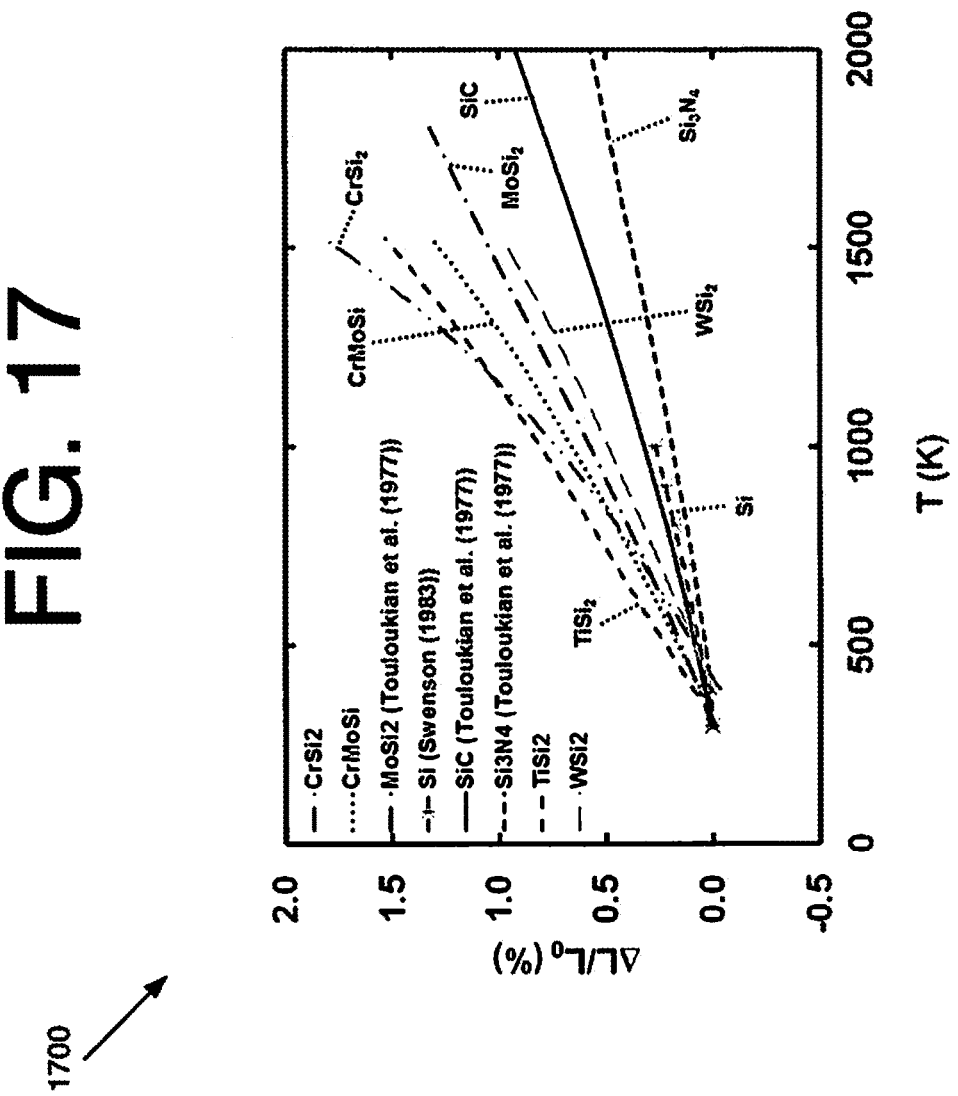
FIG. 17 is a graph 2000 illustrating a comparison of the temperature dependencies of the thermal expansions of silicon (Si), silicides and $Si_3N_4$ with that for SiC, according to an embodiment of the present invention.
Figure 18:
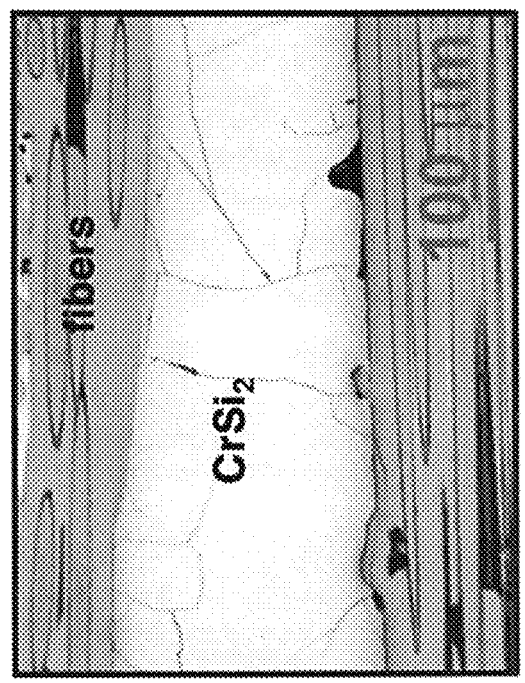
FIG. 18 is an image 2100 showing $CrSi_2$-melt infiltrated Tyranno SA3 preforms, according to an embodiment of the present invention.

FIG. 17 is a graph 1700 illustrating a comparison of the thermal expansion of silicon (Si), silicides and $Si_3N_4$ with SiC, according to an embodiment of the present invention. Graph 1700 shows that the silicide matrix cannot be simply infiltrated into a SiC preform, since the thermal expansion of the silicide matrix and SiC do not match and cracks will develop during thermal cycling. See FIG. 18, which is a micrograph 1800 showing $CrSi_2$-melt infiltrated Tyranno SA3 preforms, according to an embodiment of the present invention. In image 1800, cracks are developed in the matrix due to thermal expansion differences between the SiC fibers and the $CrSi_2$ matrix. To prevent the cracks as shown in image 1800, the properties of the EM may be adjusted to match the properties of the SiC preform.

For the purposes of matching the properties, if the thermal expansion of the matrix is below the SiC line, the matrix stresses will be compressive. However, if its thermal expansion is above the SiC line, then the matrix stresses will be tensile. This is more clearly seen in image 1800, when thermal expansion of silicide results in tension, thereby nucleating cracks.

To address this problem, Table 2 shown above may be referred to, and the following formula may be used in the ECM design.

$$(\Delta L/L_0)_{fiber} = (\Delta L/L_0)_{ECM} = V_{silicide}(\Delta L/L_0)_{silicide} + V_{SiC}(\Delta L/L_0)_{SiC} + V_{Si3N4}(\Delta L/L_0)_{Si3N4}$$

For the traditional SiC matrix, the volume fraction of the SiC particles, $V_{SiC}=100\%$ so that the thermal expansion of the fiber and the matrix are exactly matched per the above equation. In an ECM, some of the SiC particles is replaced by silicide particles of volume fraction $V_{silicide}$. However, FIG. 17 shows that the thermal expansions of silicides are higher than SiC, while that for $Si_3N_4$ is lower. Thus, the replacement of 100% SiC with a volume fraction $V_{silicide}$ of silicide necessitates that a volume fraction $V_{Si3N4}$ be added to formulate the ECM composition so that $(\Delta L/L_0)_{fiber}=(\Delta L/L_0)_{ECM}$ is satisfied in the above equation. When self-healing additives are added, the volume fraction of these additives are taken into account using additional terms in the above equation.

Figure 19:
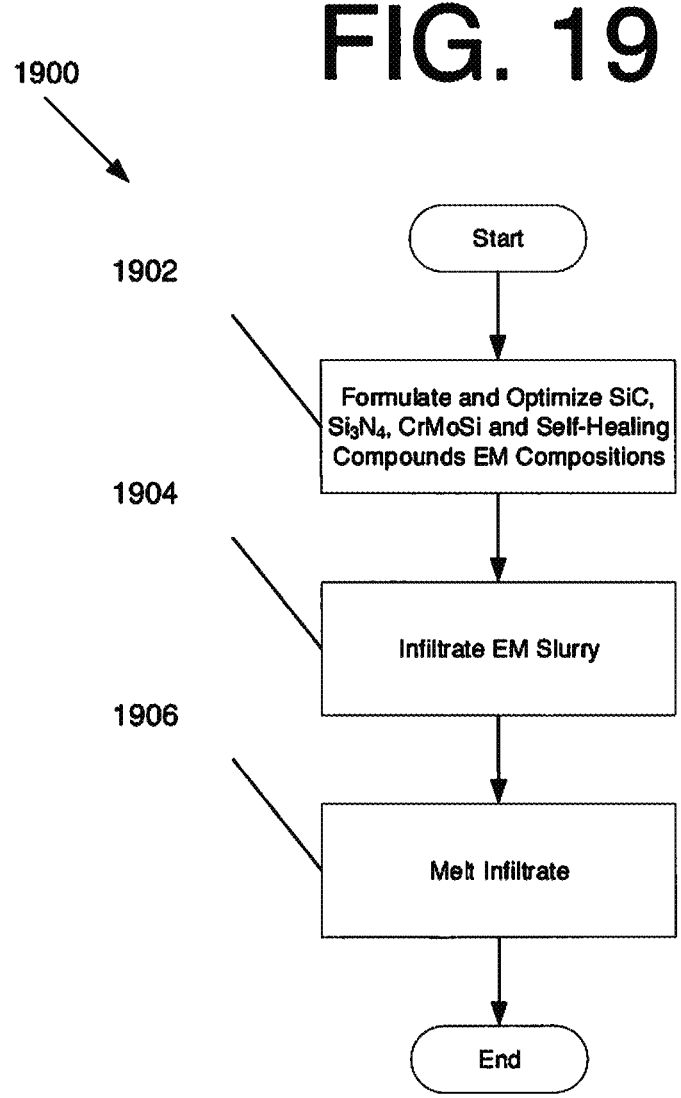
FIG. 19 is a flow diagram illustrating a process for composite fabrication, according to an embodiment of the present invention.

FIG. 19 is a flow diagram illustrating a process 1900 for composite fabrication, according to an embodiment of the present invention. In this embodiment, process 1900 may begin at 1902 with formulating and optimizing the ECM composition. For example, SiC, $Si_3N_4$, CrMoSi, $CrSi_2$ and self-healing compounds for the ECM compositions may be formulated and optimized.

At 1904, the ECM is infiltrated as a slurry, and infiltrated into the SiC preforms, or in some embodiments, SiC fibers. In an alternative embodiment, the slurry may be deposited on fibers tows followed by tape casting and hot pressing of 0/90 layup to form the composite. Simply put, the fabrication process is to infiltrate ECM slurry into voids in the SiC preforms. The void spacing is infiltrated with the ECM slurry in some embodiments.

Figure 20:
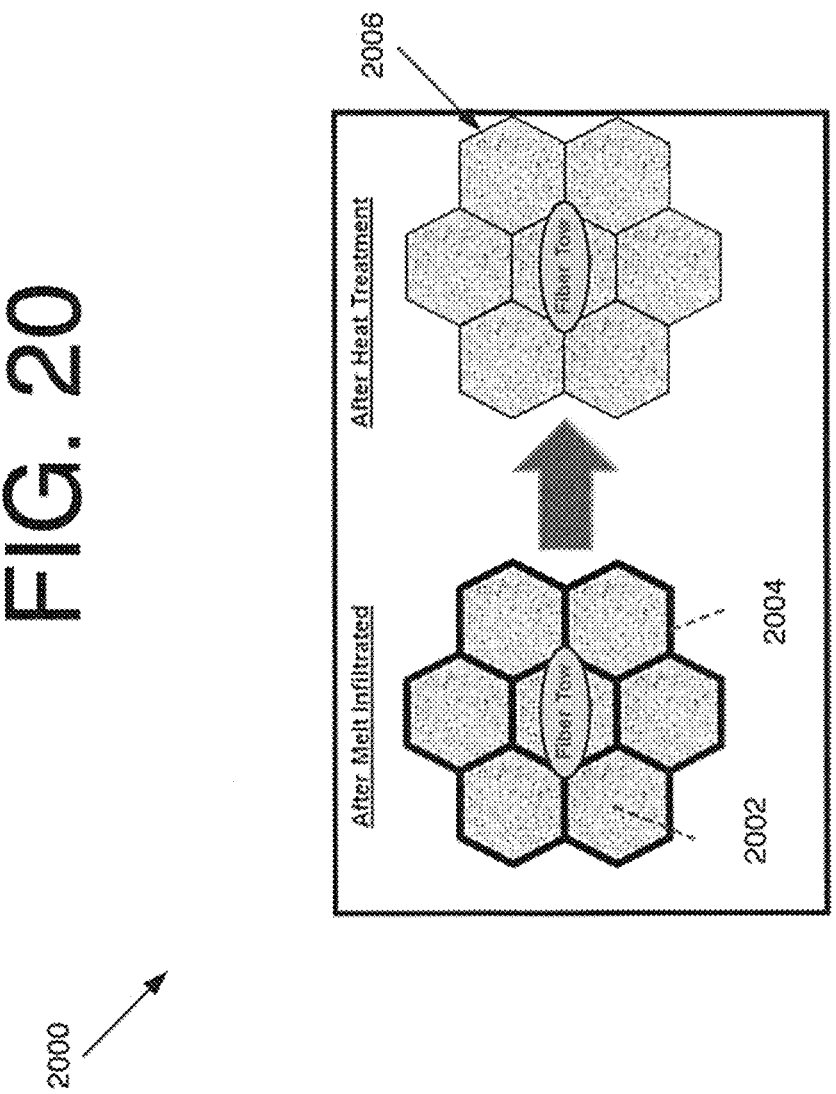
FIG. 20 schematically illustrates the microstructure of a SiC preform after melt infiltration and after heat treatment, according to an embodiment of the present invention.

At 1906, $CrSi_2$, CrSi and/or other Cr—Si alloys (e.g. Cr-25% Si) is externally melt infiltrated to fill in the remaining space in the CMC preforms and to bond the high temperature ECM particles. Alternatively, $CrSi_2$, CrSi and/ or other Cr—Si alloys (e.g. Cr-25% Si) may be infiltrated into the preform as a slurry and the slurry-infiltrated preform heated above the melting point(s) of alloy to internally melt infiltrate the alloy(s). See, for example, SiC preforms 2002 (e.g., SiC+$Si_3N_4$+CrMoSi+self-healing compounds) of FIG. 20, which may be internally and/or externally melt infiltrated with silicide 2004 (e.g., $CrSi_2$, CrSi, Cr-25% Si, or some other Cr—Si alloy). These lower melting point silicide alloys may be used to bond the powders after melt infiltration so that there is no loose configuration.

External melt infiltration is conducted by placing the slurry-infiltrated SiC preform on a C/C woven cloth sufficiently large to wick any excess molten metal. The C/C woven cloth itself is placed on a large boron nitride plate. The silicide powder is placed on top and around the preform to allow the molten metal to flow into the preform from the top face as well as from the four sides. The boron nitride plate containing the C/C woven fabric, the SiC preform, and the silicide powder are inserted into a melt infiltration furnace. The furnace is then heated to just above the melting point of the silicide powder so that it melts and flows into the preform. In other embodiments, pressure melt infiltration of slurry infiltrated performs using inert gas or nitrogen may be used.

Internal melt infiltration is conducted by incorporating the lower melting point silicide in the ECM slurry in sufficient amounts. This way, when the preform is heated above the melting point of the silicide, the silicide melts and fills the voids between the particles and any uninfiltrated voids in the preform. This may result in a bonded ECM in the CMC 2006.

Figure 21:
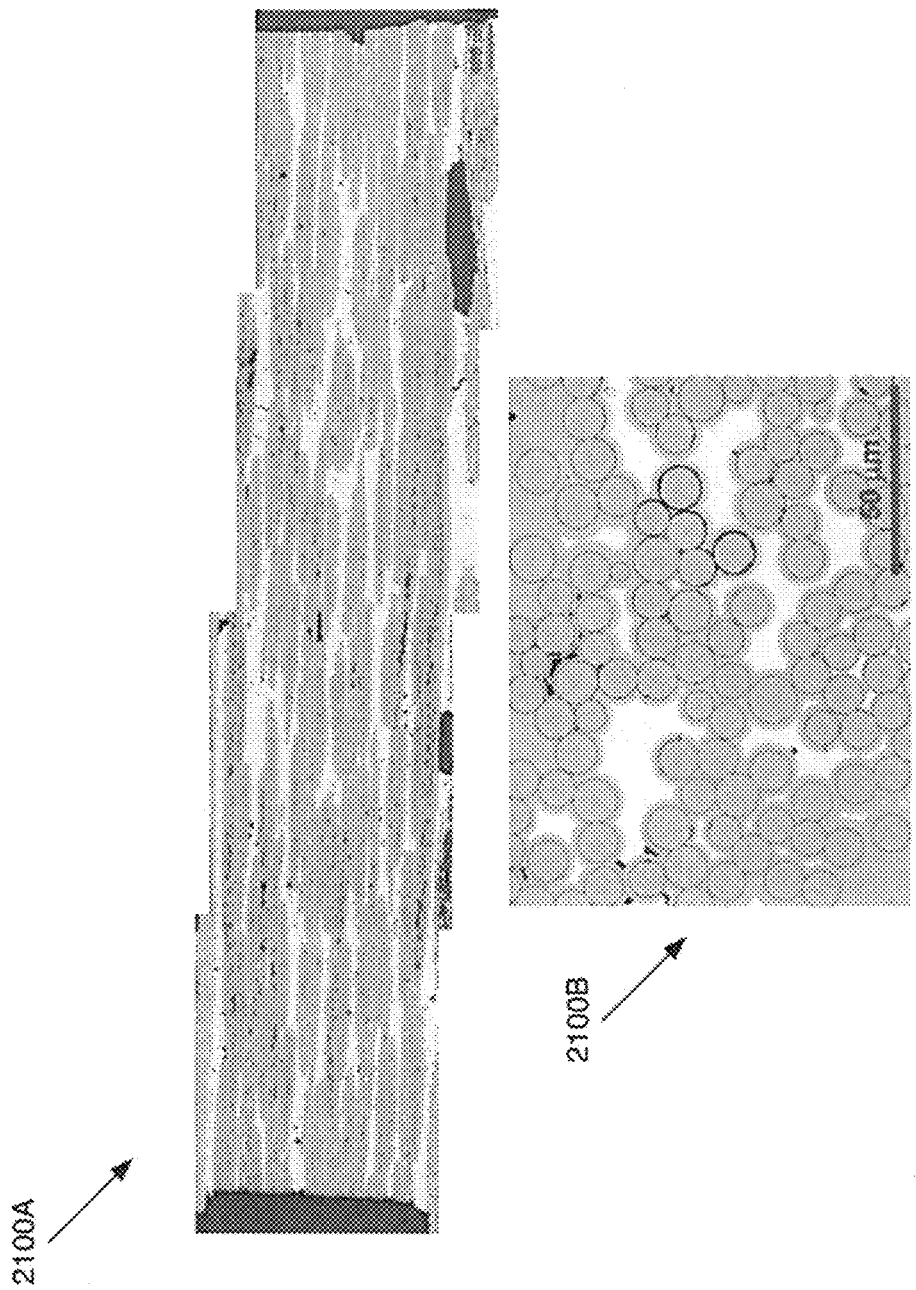
FIG. 21 are images illustrating optical micrographs of the cross-sections of $CrSi_2$-MI Tyranno SA3, according to an embodiment of the present invention.

FIG. 21 are images 2100A and 2100B showing the optical micrographs of the longitudinal and transverse cross-sections of a Tyranno SA3 preform externally melt infiltrated with $CrSi_2$, according to an embodiment of the present invention. In this embodiment, the melt infiltrated silicide matrix is shown in images 2100A and 2100B as the light regions, and the CVI SiC and the BN-coated SiC fiber tows are the darker regions around the fibers. The SiC fiber tows in the Tyranno SA3 preform were first coated with BN and then chemically vapor infiltrated with SiC according to well established commercial practice. The preform was then melt infiltrated with $CrSi_2$ in studies designed to determine the melt infiltration parameters. This preform was not slurry infiltrated with ECM prior to external melt infiltration. Melt infiltration of the preforms with $CrSi_2$ was conducted between 1765 and 1900 K for infiltration times between 0.25 and 2 h under high vacuum. Image 2400A shows an almost completely infiltrated preform.

Figure 22:
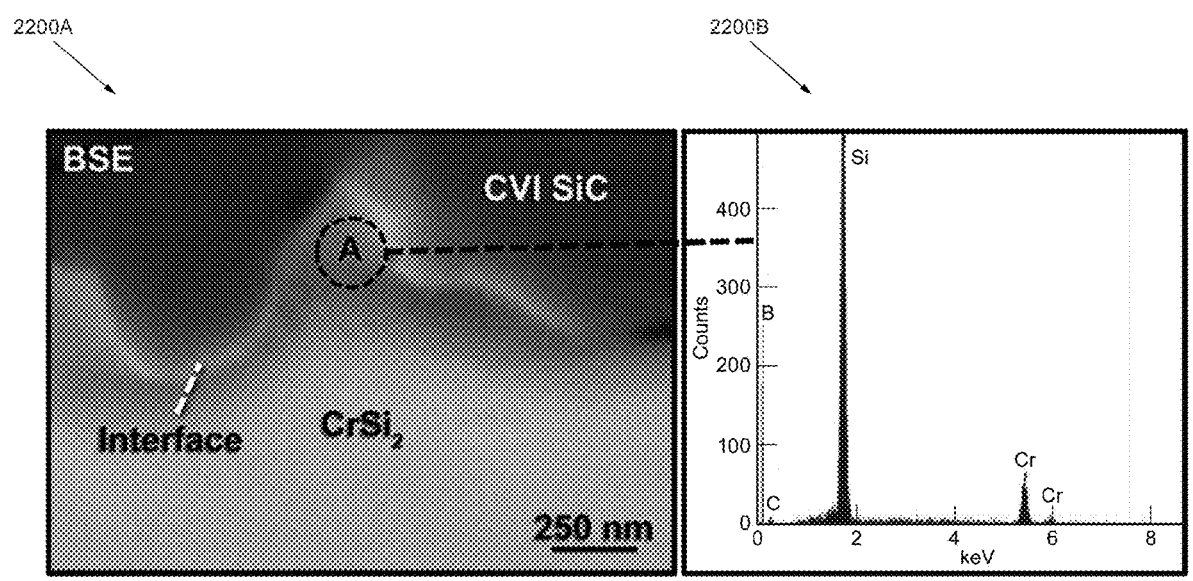
FIG. 22 illustrates a back scattered electron image and an energy dispersive spectrum that show the composition analysis near the $CrSi_2$/CVI SiC interface, according to an embodiment of this invention.

FIG. 22 illustrates a backscattered electron image 2200A and an energy dispersive spectrum (EDS) 2200B showing the composition analysis of the $CrSi_2$/CVI SiC interface, according to an embodiment of this invention. In this embodiment, image 2200A shows a high magnification view of the interface between the $CrSi_2$ matrix and the CVI SiC. More specifically, graph 2200B shows the EDS analysis of region A in 2200A indicating that there is no reaction between the melt infiltrated $CrSi_2$ and the CVI SiC, which is consistent with thermodynamic calculations.

Figure 23:
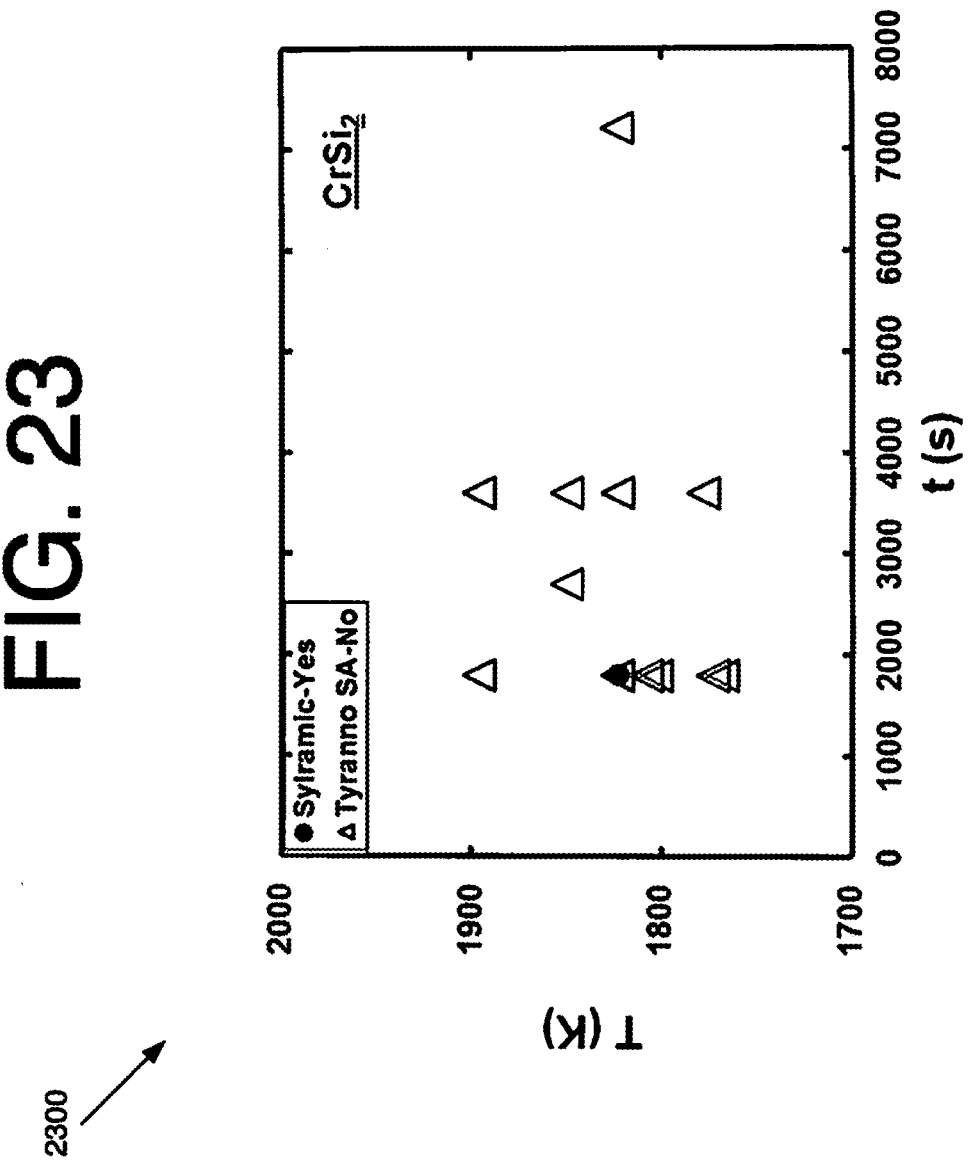
FIG. 23 is a graph illustrating a reaction plot for $CrSi_2$, according to an embodiment of the present invention.

FIG. 23 is a graph 2300 illustrating a reaction plot for $CrSi_2$, according to an embodiment of the present invention. In this embodiment, graph 2300 shows that there are two types of fiber preforms consisting of either Tyranno SA or Sylramic fibers that were investigated in the melt infiltration optimization studies. Graph 2300 shows the melt infiltration temperature plotted as a function of the melt infiltration time when the $CrSi_2$ alloy was used for melt infiltrating the preforms. As shown in FIG. 23, no reaction was observed when the Tyranno SA3 preforms were melt infiltrated with $CrSi_2$. In contrast, some reaction was observed in the case of the Sylramic preform. Although CVI SiC did not react with $CrSi_2$ as shown in FIG. 22, the presence of some elements, such as free carbon and Ti in the Sylramic preform, can lead to a reaction.

Figure 24:
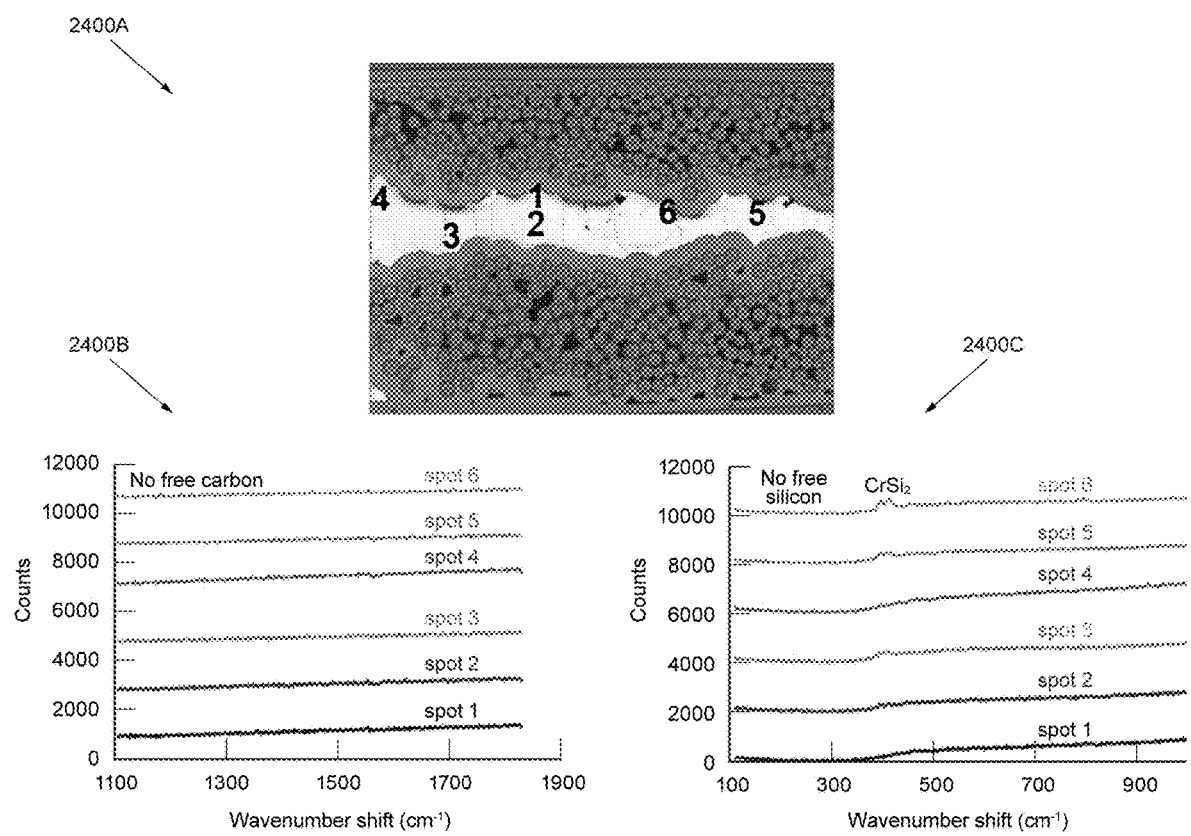
FIG. 24 illustrates a Raman spectra of $CrSi_2$ melt-infiltrated Tyranno SA3 at various locations, according to an embodiment of the present invention.

FIG. 24 illustrates a Raman spectra 2400 of $CrSi_2$ melt-infiltrated Tyranno SA3 obtained at various locations 1 to 6, according to an embodiment of the present invention. Raman spectral spot analyses were obtained from the melt-infiltrated $CrSi_2$ matrix in the Tyranno SA3 preform to determine if there was any free carbon (C) and free Si present. The C and Si spectral data from the six spots identified as 1, 2, 3, 4, 5, and 6 in 2400A are shown in 2400B and 2400C, respectively. As evident in both these spectra, there is no significant free C and free Si in the melt-infiltrated silicide matrix, thereby fulfilling an important objective of this study to minimize or eliminate free Si.

Figure 25:
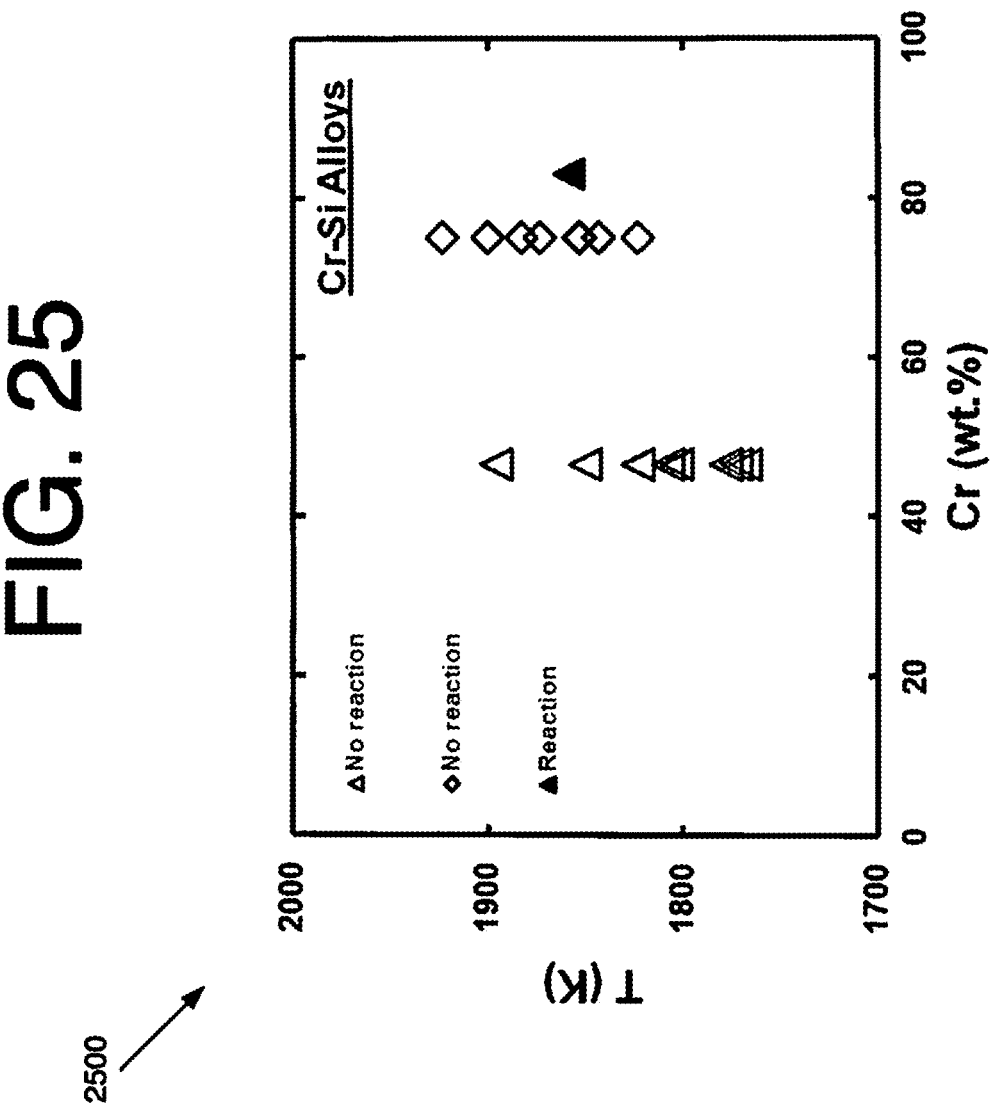
FIG. 25 is a reaction plot illustrating the melt infiltration temperature against Cr composition of the Cr—Si melt after melt infiltration, according to an embodiment of the present invention.

FIG. 25 is a reaction plot 2500 illustrating the melt infiltration temperature against Cr composition of the Cr—Si melt after melt infiltration, according to an embodiment of the present invention. In assessing FIG. 25, it is relatively clear that Cr—Si alloys that include more than 80 (wt. %)Cr are likely to react with the CVI SiC, BN coatings and SiC fibers.

Figure 26:
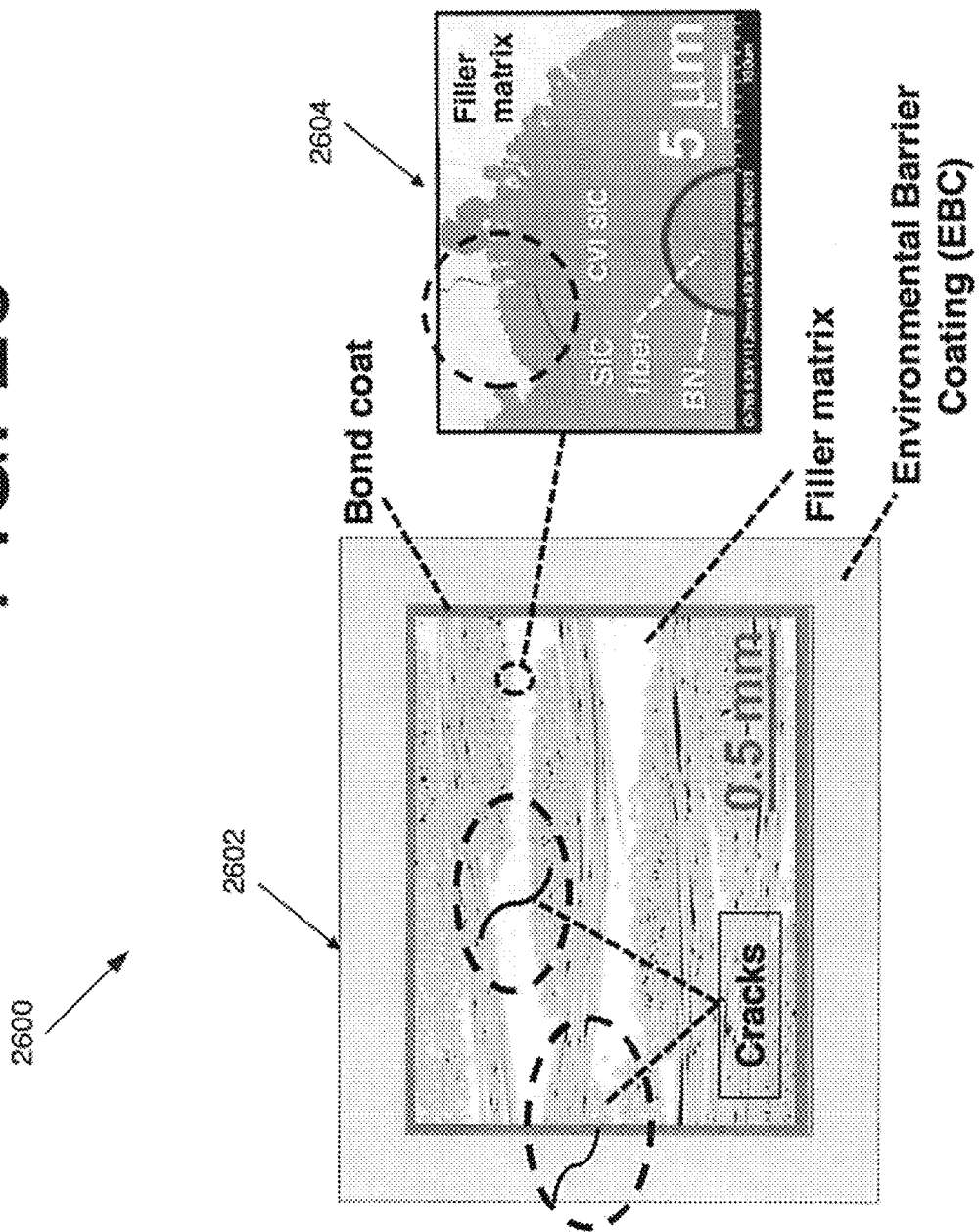
FIG. 26 is a schematic diagram illustrating an environmental barrier coating (EBC), bond coat, filler matrix, and SiC preform, according to an embodiment of the present invention.

Some embodiments generally pertain to a CMC matrix that eliminates the presence of free Si to inhibit crack propagation and to self-heal cracks, preventing oxygen ingress from the surface and protecting the BN coatings. FIG. 26 is a schematic diagram 2600 illustrating an environmental barrier coating (EBC), bond coat, filler matrix, and SiC preform, according to an embodiment of the present invention. As shown in FIG. 26, a crack 2602 that develops in the outer protective EBC may propagate into the bond coat to the filler matrix and finally to the CVI SiC 2604 and BN coatings on the fibers. This may result in oxygen ingress from the surface to the BN coatings, oxidizing the coatings and limiting the useful life of the CMC. Similarly, an internal crack may propagate from a fiber tow through the filler matrix to another fiber tow.

Some embodiments slow down or stop crack propagation, self-heal the crack to prevent or minimize oxygen ingress and ensure that the silicon content in the matrix is zero, enabling the CMC to be used in applications up to 1755 K (2700 F). In some embodiments, an ECM may include one or more of the following properties—high temperature, lightweight, self-healing, and SiC fiber-reinforced ceramic composites. The ECM may be constructed by way of mixing different volume fractions of three or more constituents so that the following condition is fulfilled $$(\Delta L/L_0)_{fiber}=(\Delta L/L_0)_{ECM}=V_1(\Delta L/L_0)_1+V_2(\Delta L/L_0)_2+V_3(\Delta L/L_0)_3 \quad \text{Equation (1)}$$

where $(\Delta L/L_0)_{fiber}$ is the thermal strain in the fiber, $(\Delta L/L_0)_{ECM}$ is the thermal strain in the engineered ceramics matrix, $(\Delta L/L_0)_i$ is the thermal strain of the $i^{th}$ constituent (I=1, 2, 3, . . . n), $V_1$ is the volume fraction of the $i^{th}$ constituent, and $$\sum_{i=1}^{n} V_i = 1.$$

One of ordinary skill in the art would appreciate that Equation (1) is a general concept applicable for non-reactive fiber E-CMC.

For embodiments that include silicide, SiC, $Si_3N_4$, and SH additives, Equation (1) can be expressed as follows $$\left(\frac{\Delta L}{L_0}\right)_{SiC\ fiber} = $$

$$\left(\frac{\Delta L}{L_0}\right)_{ECM} = V_{Silicide}(\Delta L/L_0)_{Silicide} + V_{SiC}(\Delta L/L_0)_{SiC} + $$

$$V_{Si3N4}(\Delta L/L_0)_{Si3N4} + V_{SH}(\Delta L/L_0)_{SH}$$

Equation (2)

where $V_{Silicide}$ $(\Delta L/L_0)_{Silicide}$, $V_{SH}$, and $(\Delta L/L_0)_{SH}$ are generically used to denote the volume fraction(s) of silicides and self-healing additives of different compositions, respectively.

Table 3 below shows compositions of several engineered ceramic matrices in weight percentages with and without self-healing additives.

TABLE 3

| Compositions | Compositions |
|---|---|
| 20%CrMoSi-80%SiC | 25%CrMoSiGe-49%SiC-25%Si3N4-1%CrB2 (Run 695a) |
| 20%CrMoSiY-80%SiC | 25%CrMoSiGe-45%SiC-25%Si3N4-5%CrB2 (Run 696a) |
| 20%CrMoSiGe-80%SiC | 25%CrMoSiGe-425%SiC-25%Si3N4-5%CrB2-2.5%Y2O3 (Run 698) |
| 20%CrMoSi-79%.SiC-ICrB$_2$ | 25%CrMoSiGe-40%SiC-25%Si3N4-5%CrB2-5%Y2O3 (Run 699) |
| 20%CrMoSi-75%SiC-5%CrB$_2$ | 25%CrMoSiGe-44%SiC-25%Si3N4-5%CrB2-1%ZrSiO4 (Run 701) |
| 20%CrMoSi-79%SiC-1%ZrSiO$_4$ | 25%CrMoSiGe-45%SiC-25%Si3N4-5%Y2O3 (Run 702) |
| 20%CrMoSi-75%SiC-5%ZrSiO$_4$ | 20%CrSi2-55%SiC-20%Si3N4-5%CrB2 (Run 704) |
| 20%CrSi$_2$-79%SiC- ICrB$_2$ | 20%CrSi2-55%SiC-20%Si3N4-5%Y2O3 (Run 706) |
| 20%CrSi$_2$-75%SiC-5CrB$_2$ | 20%CrSi2-50%SiC-20%Si3N4-5%CrB2-5%Y2O3 (Run 708) |
| 20%CrSi$_2$-79%SiC-1%ZrSiO$_4$ | |
| 20%CrSi$_2$-75%SiC-5%ZrSiO$_4$ | |

From the compositions shown in Table 3, new compositions may be formulated for the next generation of engineering ceramic matrices, where the compositions are given in volume percentages using Equation (2). See Table 4.

TABLE 4

| | CrMoSiGe Vol. % | CrSi$_2$ Vol. % | SiC Vol. % | Si$_3$N$_4$ Vol. % | CrB$_2$ Vol. % | B$_4$C Vol. % | ZrSiO4 Vol. % | Y2O3 Vol. % | Total Vol. % |
|---|---|---|---|---|---|---|---|---|---|
| 9%CrMoSiGe+1%CrSi$_2$+55%SiC+35%Si$_3$N$_4$ (ROM) | 9 | 1 | 55 | 35 | | | | | 100 |
| 5%CrMoSiGe+5%CrSi$_2$+55%SiC+35%Si$_3$N$_4$ (ROM) | 5 | 5 | 55 | 35 | | | | | 100 |

TABLE 4-continued

| | CrMoSiGe Vol. % | CrSi$_2$ Vol. % | SiC Vol. % | Si$_3$N$_4$ Vol. % | CrB$_2$ Vol. % | B$_4$C Vol. % | ZrSiO4 Vol. % | Y2O3 Vol. % | Total Vol. % |
|---|---|---|---|---|---|---|---|---|---|
| 9%CrMoSiGe+1%CrSi$_2$+55%SiC+ 30%Si$_3$N$_4$+5%CrB$_2$ (ROM) | 9 | 1 | 55 | 30 | 5 | | | | 100 |
| 5%CrMoSiGe+5%CrSi$_2$+55%SiC+ 30%Si$_3$N$_4$+5%CrB$_2$ (ROM) | 5 | 5 | 55 | 30 | 5 | | | | 100 |
| 9%CrMoSiGe+1%CrSi$_2$+55%SiC+ 30%Si$_3$N$_4$+4%CrB$_2$+1%B$_4$C (ROM) | 9 | 1 | 55 | 30 | 4 | 1 | | | 100 |
| 5%CrMoSiGe+5%CrSi$_2$+55%SiC+ 30%Si$_3$N$_4$+3%CrB$_2$+2%B$_4$C (ROM) | 5 | 5 | 55 | 30 | 3 | 2 | | | 100 |
| 9%CrMoSiGe+1%CrSi$_2$+55%SiC+ 30%Si$_3$N$_4$+4%CrB$_2$+1%Y$_2$O$_3$ (ROM) | 9 | 1 | 55 | 30 | 4 | | | 1 | 100 |
| 5%CrMoSiGe+5%CrSi$_2$+55%SiC+ 30%Si$_3$N$_4$+3%CrB$_2$++2%Y$_2$O$_3$ (ROM) | 5 | 5 | 55 | 30 | 3 | | | 2 | 100 |

The equivalent compositions in weight percentages are shown in Table 5 below.

TABLE 5

| | | CrMoSiGe Wt. % | CrSi$_2$ Wt. % | SiC Wt. % | Si$_3$N$_4$ Wt. % | CrB$_2$ Wt. % | B$_4$C Wt. % | ZrSiO4 wt. % | Y$_2$O$_3$ wt. % | Total wt. % |
|---|---|---|---|---|---|---|---|---|---|---|
| Mix 1 | 9%CrMoSiGe+1%CrSi$_2$+55%SiC+ 35%Si$_3$N$_4$ (ROM) | 18.09 | 1.23 | 49.41 | 31.27 | | | | | 100 |
| Mix 2 | 5%CrMoSiGe+5%CrSi$_2$+55%SiC+ 35%Si$_3$N$_4$ (ROM) | 10.38 | 6.33 | 51.01 | 32.29 | | | | | 100 |
| Mix 3 | 9%CrMoSiGe+1%CrSi$_2$+55%SiC+ 30%Si$_3$N$_4$+5%CrB$_2$ (ROM) | 17.61 | 1.19 | 48.10 | 26.10 | 7.00 | | | | 100 |
| Mix 4 | 5%CrMoSiGe+5%CrSi$_2$+55%SiC+ 30%Si$_3$N$_4$+5%CrB$_2$ (ROM) | 10.09 | 6.15 | 49.61 | 26.92 | 7.22 | | | | 100 |
| Mix 5 | 9%CrMoSiGe+1%CrSi$_2$+55%SiC+ 30%Si$_3$N$_4$+4%CrB$_2$+1%B$_4$C (ROM) | 17.74 | 1.20 | 48.44 | 26.28 | 5.64 | 0.69 | | | 100 |
| Mix 6 | 5%CrMoSiGe+5%CrSi$_2$+55%SiC+ 30%Si$_3$N$_4$+3%CrB$_2$+2%B$_4$C (ROM) | 10.25 | 6.25 | 50.36 | 27.32 | 4.40 | 1.43 | | | 100 |
| Mix 7 | 9%CrMoSiGe+1%CrSi$_2$+55%SiC+ 30%Si$_3$N$_4$+4%CrB$_2$+1%Y$_2$O$_3$ (ROM) | 17.62 | 1.19 | 48.11 | 26.11 | 5.60 | | | 1.36 | 100 |
| Mix 8 | 5%CrMoSiGe+5%CrSi+55%SiC+ 30%Si$_3$N$_4$+3%CrB$_2$++2%Y$_2$O$_3$ (ROM) | 10.10 | 6.16 | 49.65 | 26.94 | 4.34 | | | 2.81 | 100 |

In some embodiments, CrMoSi denotes the Cr-30 (at. %)Mo-30 (at. %)Si alloy while CrMoSiGe denotes the Cr-30 (at. %)Mo-29 (at. %)Si-1 (at. %)Ge alloy. Either silicide may provide a way for blunting cracks at high temperatures (see FIG. 9) due to the fact that the silicides become ductile at such high temperatures. Similarly, the presence of CrSi$_2$ particles in alloys may provide crack blunting capabilities to the engineered ceramic matrices (see FIG. 8). However, the main roles of CrSi$_2$ particles are to permit internal melt infiltration to fill voids in the CMC preforms. As discussed above, internal melt infiltration may be conducted after infiltrating the CMC preform with a slurry containing the ECM shown in Tables 4 and 5 and heating the slurry-infiltrated CMC preform above the melting point of CrSi$_2$ to allow it to melt and fill cracks and voids remaining in the preform.

In some embodiments, Si$_3$N$_4$ is present in the engineered ceramic matrices, since the thermal expansion mismatch between the silicides and SiC can be eliminated by adding sufficient amounts of Si$_3$N$_4$ to compensate for the higher thermal expansion of the silicides. It should be noted that Mix 1 and 2 do not contain self-healing additives (i.e., $V_{SH}$=0% in Equation (2)) and are designed to blunt cracks with ductile silicide particles at high temperatures, with no free silicon. Mix 3 and 8 contain Chromium Boride (CrB$_2$), Boron Carbide (B$_4$C) and Y$_2$O$_3$, or any combination thereof. Composition ranges for the different constituents may include (a) 5 to 25 (vol. %) CrMoSi or CrMoSiGe; (b) 50 to 85 (vol. %) SiC; (c) 5 to 35 (vol. %) Si$_3$N$_4$; (d) 0 to 10 (vol. %)CrSi$_2$ or Cr—Si alloy; (e) 0 to 10 (vol. %) of self-healing compounds such as boron carbide (B$_4$C), chromium diboride (CrB$_2$), germanium (Ge), yttrium (Y), zirconium diboride (ZrB$_2$), zirconium silicate (ZrSiO$_4$) singly, or in combination thereof.

Figure 27:
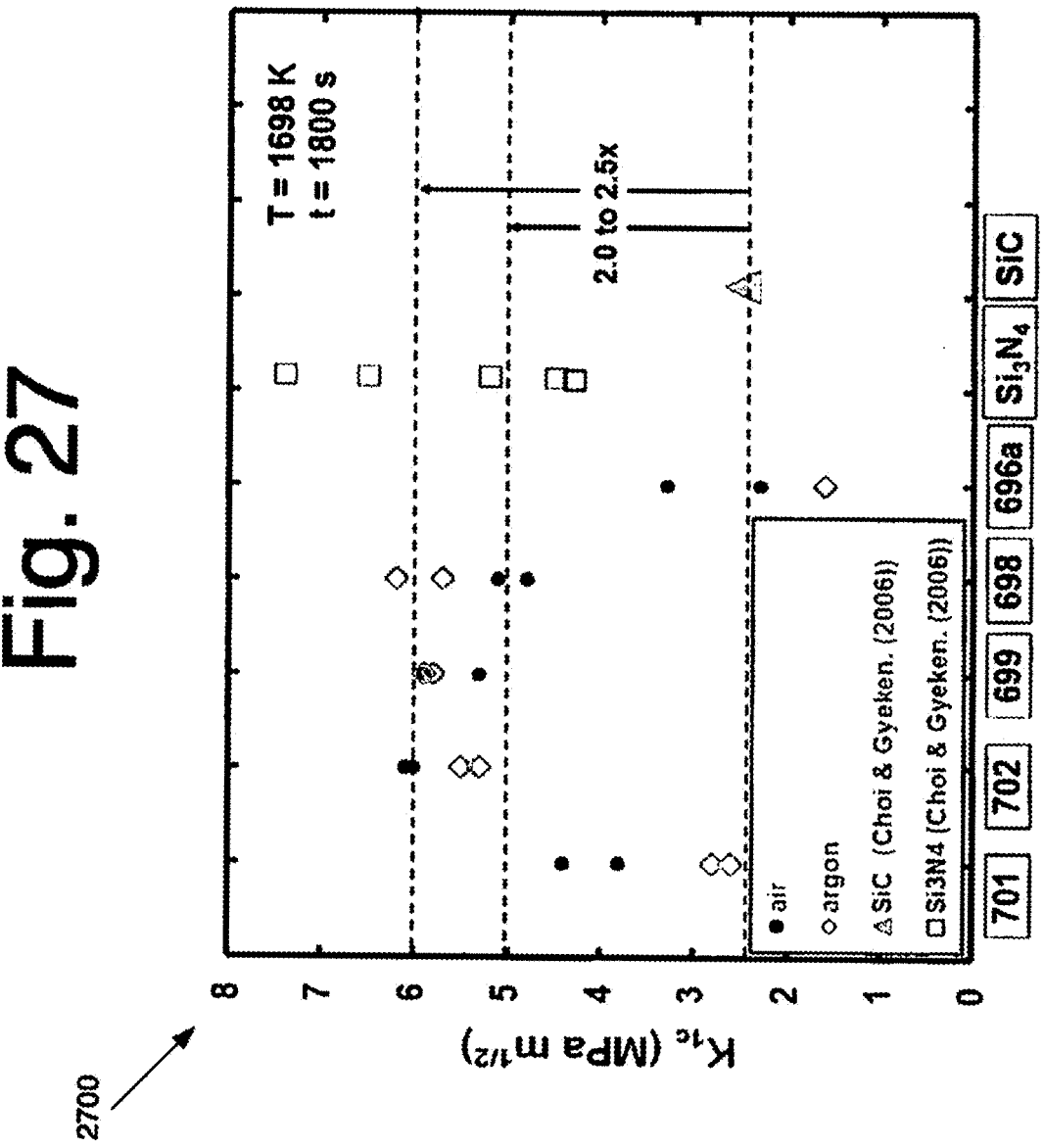
FIG. 27 is a graph illustrating a comparison of the fracture toughness, $K_{1C}$, of some of the compositions from Table 3 showing a significant improvement in $K_{1C}$ over that for monolithic SiC, according to an embodiment of the present invention.

FIG. 27 is a graph 2700 illustrating a comparison of the fracture toughness of some of the compositions from Table 3, according to an embodiment of the present invention. More specifically, graph 2700 shows that the compositions are two to three times greater than that of monolithic SiC and similar to those of advanced monolithic Si$_3$N$_4$. Looking at the earlier compositions (e.g., from Table 3) and FIG. 27, the ECM may possess relatively high fracture toughness's at high temperatures compared to the CVI SiC matrix due to an ability to plastically blunt cracks by the ductile silicide particles. The presence of self-healing compounds heals any crack and/or damage to eliminate or minimize oxygen ingress from the surface to the interior. Furthermore, the composition of CrMoSi silicides eliminate the need for free silicon in the engineered ceramics matrices. Collectively, these properties increase the durability and crack resistance of the matrix in a CMC over a full CVI SiC matrix and be applicable for 1755 K (2700 F) applications.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for fabricating engineered ceramic matrix composites (E-CMCs) for high temperature applications, comprising:
    combining and attrition milling a mixture of silicon carbide (SiC), silicon nitride, and a component selected from the group consisting of CrMoSi, CrMoSiGe, and CrMoSiY;
    wet attrition milling the mixture using ethanol and silicon carbide grinding media, grinding the mixture into particles and homogenously mixing the mixture;
    slurry preparing the mixture to generate an engineered CMC slurry;
    infiltrating a preform with the engineered CMC slurry either under gravity, vacuum, or high pressure to allow particulates to spread uniformly within cavities of the preform; and
    melt infiltrating the preform with $CrSi_2$, CrSi, $Cr_5Si_3$, or any combination thereof to fill in voids left behind after the slurry infiltration.

2. The process of claim 1, wherein the component is a chromium silicide alloy having a melting point less than 1550° C., to prevent the fibers from fusing and reacting with the melt.

3. The process of claim 1, wherein the wet attrition milling of the mixture is between 48 and 64 hours.

4. The process of claim 1, further comprising:
    after the wet attrition milling of the mixture, decanting the ethanol, air drying the mixture and then placing the mixture in an oven to turn the mixture into a dry cake to be grounded using a mortar and pestle to a fine powder.

5. The process of claim 1, wherein the slurry preparing of the engineered CMC comprises mixing powders in an aqueous alkaline ammonium hydroxide solution containing a dispersant.

6. The process of claim 1, wherein the melt infiltrating of the preform comprises
    melt infiltrating $CrSi_2$, CrSi, $Cr_5$ $Si_3$, or any combination into a slurry infiltrated SiC/SiC preform via external melt infiltration.

7. The process of claim 6, wherein the melt infiltrated SiC/SiC preform comprises voids between fibers that are filled by molten CrSi2, CrSi, $Cr_5Si_3$, or any combination.

8. The process of claim 1, wherein the mixture further comprises one or more self-healing additives selected from the group consisting of $B_4C$, $CrB_2$, Ge, Y, $ZrB_2$, and $ZrSiO_4$.

* * * * *